US012724974B2

(12) United States Patent
Shekhar et al.

(10) Patent No.: US 12,724,974 B2
(45) Date of Patent: Sep. 1, 2026

(54) DETERMINING LARGE LANGUAGE MODEL EFFECTIVENESS UTILIZING DEEP LEARNING

(71) Applicant: Adobe Inc., San Jose, CA (US)

(72) Inventors: Shivanshu Shekhar, Bokaro Steel City (IN); Tanishq Dubey, New Delhi (IN); Koyel Mukherjee, Bangalore (IN); Apoorv Umang Saxena, Bengaluru (IN); Atharv Tyagi, New Delhi (IN); Nishanth Kotla, Visakhapatnam (IN)

(73) Assignee: Adobe Inc., San Jose, CA (US)

( * ) Notice: Subject to any disclaimer, the term of this patent is extended or adjusted under 35 U.S.C. 154(b) by 176 days.

(21) Appl. No.: 18/671,265

(22) Filed: May 22, 2024

(65) Prior Publication Data

US 2025/0363306 A1 Nov. 27, 2025

(51) Int. Cl.
*G06F 17/27* (2006.01)
*G06F 40/30* (2020.01)

(52) U.S. Cl.
CPC .................................... *G06F 40/30* (2020.01)

(58) Field of Classification Search
CPC ........... G06F 40/30; G06F 40/40; G06F 16/00
USPC ............................................................... 704/9
See application file for complete search history.

(56) References Cited

U.S. PATENT DOCUMENTS

| | | | | |
|---|---|---|---|---|
| 2018/0240013 | A1* | 8/2018 | Strope | G06F 16/00 |
| 2023/0237257 | A1* | 7/2023 | Walters | G06F 40/40 715/229 |
| 2025/0094708 | A1* | 3/2025 | Cunningham | G06F 40/30 |
| 2025/0094728 | A1* | 3/2025 | Ouyang | G06F 40/40 |

FOREIGN PATENT DOCUMENTS

| | | | | |
|---|---|---|---|---|
| CN | 115129928 A * | 9/2022 | | G06F 16/7867 |
| CN | 118504547 A * | 8/2024 | | G06F 18/22 |

OTHER PUBLICATIONS

Bajaj, P., Campos, D., Craswell, N., Deng, L., Gao, J., Liu, X., Majumder, R., McNamara, A., Mitra, B., Nguyen, T., Rosenberg, M., Song, X., Stoica, A., Tiwary, S., and Wang, T. "MS MARCO: A Human Generated Machine Reading Comprehension Dataset", 2016.

(Continued)

*Primary Examiner* — Md S Elahee
(74) *Attorney, Agent, or Firm* — Keller Preece PLLC

(57) ABSTRACT

The present disclosure relates to systems, non-transitory computer-readable media, and methods for predicting summary quality scores and determining summary generation costs of large language models to generate a digital document summary. In particular, in one or more embodiments, the disclosed systems extract one or more text segments from a digital document. Further, the disclosed systems generate, utilizing a quality prediction neural network, a predicted summary quality score for each of a plurality of large language models for the one or more text segments. Furthermore, the disclosed systems select a large language model from the plurality of large language models based on the predicted summary quality scores. Moreover, the disclosed systems generate, utilizing the selected large language model, a summary of the digital document.

20 Claims, 13 Drawing Sheets

(56) References Cited

OTHER PUBLICATIONS

Banerjee, S., and Lavie, A. "METEOR: An Automatic Metric for MT Evaluation with Improved Correlation with Human Judgments". In Proceedings of the ACL Workshop on Intrinsic and Extrinsic Evaluation Measures for Machine Translation and/or Summarization (Ann Arbor, Michigan), Association for Computational Linguistics, pp. 65-72, Jun. 2005.
Chen, L., Zaharia, M., and Zou, J. "Efficient Online ML API Selection for Multi-Label Classification Tasks", arXiv preprint arXiv:2102.09127v1, Feb. 18, 2021.
Chen, L., Zaharia, M., and Zou, J. "FrugalGPT: How to Use Large Language Models While Reducing Cost and Improving Performance". arXiv preprint arXiv:2305.05176v1, May 9, 2023.
Chen, L., Zaharia, M., and Zou, J. "FrugalML: How to Use ML Prediction APIs More Accurately and Cheaply", NeurIPS, 2020.
Chui, M., Hazan, E., Roberts, R., Singla, A., Smaje, K., Sukharevsky, A., Yee, L., and Rodney Zemmel, M. C. "The economic potential of generative AI: The next productivity frontier", webpage<https://www.mckinsey.com/capabilities/mckinsey-digital/our-insights/the-economic-potential-of-generative-ai-the-next-productivity-frontier#introduction>, 68 pages, Jun. 2023.
Eugene Vyborov. "GPT-3 API Latency—Model Comparison". webpage <https://medium.com/@evyborov/gpt-3-api-latency-model-comparison-13888a834938> 4 pages. Feb. 20, 2023.
Ghalandari, D. G., Hokamp, C., and Ifrim, G. "Efficient Unsupervised Sentence Compression by Fine-tuning Transformers wit Reinforcement Learning", Association for Computation Linguistics, vol. 1, pp. 1267-1280, May 2022.
Gliwa, B., Mochol, I., Biesek, M., and Wawer, A. "SAMSum Corpus: A Human-annotated Dialogue Dataset for Abstractive Summarization", Association for Computation Linguistics, pp. 70-79, Nov. 4, 2019.
Huang, L., Bras, R. L., Bhagavatula, C., and Choi, Y. "COSMOS QA: Machine Reading Comprehension with Contextual Commonsense Reasoning", Association for Computational Linguistics, pp. 2391-2401, Nov. 2019.
Khalili, L., You, Y., and Bohannon, J. "BabyBear: Cheap Inference Triage for Expensive Language Models", arXiv preprint arXiv:2205.11747v1, May 24, 2022.
Lebret, R., Grangier, D., and Auli, M. "Neural Text Generation from Structured Data with Application to the Biography Domain", Association for Computational Linguistics, pp. 1203-1213, Nov. 2016.
Levenshtein, V. I., et al. "Binary Codes Capable of Correcting Deletions, Insertions, and Reversals". In Soviet Physics Doklady, vol. 10, No. 8, Soviet Union, pp. 707-710, Feb. 1966.
Lewis, M., Liu, Y., Goyal, N., Ghazvininejad, M., Mohamed, A., Levy, O., Stoyanov, V., and Zettlemoyer, L. "BART: Denoising Sequence-to-Sequence Pre-Training for Natural Language Generation, Translation, and Comprehension", arXiv preprint arXiv:1910.13461v1, Oct. 29, 2019.
Lin, C-Y, "ROUGE: A Package for Automatic Evaluation of Summaries". In Text Summarization Branches Out, pp. 74-81, Barcelona, Spain, Association for Computational Linguistics, Jul. 2004.
Liu, H., Cui, L., Liu, J., and Zhang, Y. "Natural Language Inference in Context—Investigating Contextual Reasoning over Long Texts", arXiv preprint arXiv:2011.04864v1, Nov. 10, 2020.
Liu, J., Cui, L., Liu, H., Huang, D., Wang, Y., and Zhang, Y. "LogiQA: A Challenge Dataset for Machine Reading Comprehension with Logical Reasoning", arXiv preprint arXiv:2007.08124v1, Jul. 16, 2020.
Mamou, J., Pereg, O., Wasserblat, M., and Schwartz, R. "TangoBERT: Reducing Inference Cost by using Cascaded Architecture", arXiv preprint arXiv:2204.06271v1, Apr. 13, 2022.
Martin, L., Fan, A., Éric de la Clergerie, Bordes, A., and Sagot, B. "MUSS: Multilingual Unsupervised Sentence Simplification by Mining Paraphrases", European Language Resources Association (ELRA), pp. 1651-1664, Jun. 2022.
Martin, L., Sagot, B., Éric de la Clergerie, and Bordes, A. "Controllable Sentence Simplification", European Language Resource Association (ELRA), pp. 4689-4698, May 2020.
Maryam Ashoori. "Decoding the True Cost of Generative AI for Your Enterprise". Webpage <https://www.linkedin.com/pulse/decoding-true-cost-generative-ai-your-enterprise-maryam-ashoori-phd/>, 6 pages [Retrieved on Jul. 3, 2024].
OpenAI. "Pricing". webpage <https://openai.com/api/pricing/>, 5 pages [Retrieved on Jul. 3, 2024].
OpenAI. "Tiktoken". Webpage <https://github.com/openai/tiktoken>, 2 pages, May 13, 2024. [Retrieved on Jul. 3, 2024].
OpenAI. "OpenAI". Webpage <https:openai.com/>, 3 pages [Retrieved on Jul. 3, 2024].
Ott, M., Edunov, S., Baevski, A., Fan, A., Gross, S., Ng, N., Grangier, D., and Auli, M. "FAIRSEQ: A Fast, Extensible Toolkit for Sequence Modeling", Association for Computational Linguistics, pp. 48-53, Jun. 2019.
Papineni, K., Roukos, S., Ward, T., and Zhu, W-J. "BLEU: a Method for Automatic Evaluation of Machine Translation". In Proceedings of the 40th Annual Meeting of the Association for Computational Linguistics (Philadelphia, Pennsylvania, USA), Association for Computational Linguistics (ACL), pp. 311-318, Jul. 2002.
Peter Norvig, Tyler Barrus, "Pyspellchecker". Webpage <https://pypi.org/project/pyspellchecker/>, MIT License, 3 pages, Jan. 20, 2024. [Retrieved on Jul. 3, 2024].
Ranodeb Banerjee, O. "Automatic Document Processing with Large Language Models". Webpage <https://www.linkedin.com/pulse/automatic-document-processing-large-language-models-ranodeb-banerjee/?utm_source=rss&utm_campaign=articles_sitemaps&utm_medium=google_news>, Sep. 25, 2023. [retrieved on Jul. 5, 2024].
Sallam, R. "Take This View to Assess ROI for Generative AI". Webpage <https://www.gartner.com/en/articles/take-this-view-to-assess-roi-for-generative-ai>, 4 pages, Aug. 15, 2023, [retrieved on Jul. 5, 2024].
Sarunas Navickas. "Thesaurus". Webpage <https://github.com/zaibacu/thesaurus>, 1 page, [Retrieved on Jul. 3, 2024].
Shafaq Naz, E. C. "Reinventing Logistics: Harnessing Generative AI and GPT for Intelligent Document Processing". Webpage <https://www.e2enetworks.com/blog/reinventing-logistics-harnessing-generative-ai-and-gpt-for-intelligent-document-processing>, 5 pages, Sep. 11, 2023. [retrieved on Jul. 5, 2024].
Sharma, E., Li, C., and Wang, L. "BigPatent: A Large-Scale Dataset for Abstractive and Coherent Summarization", Association for Computational Lingustics, pp. 2204-2213, Jul. 2019.
Tom Aarsen, et al. "NLTK Natural Language Toolkit". webpage <https://www.nltk.org/>, 1 page, Jan. 2, 2023.
Touvron, H., Martin, L., Stone, K., Albert, P., Almahairi, A., Babaei, Y., Bashlykov, N., Batra, S., Bhargava, P., Bhosale, S., et al. "LLAMA 2: Open Foundation and Fine-Tuned Chat Models". arXiv preprint arXiv:2307.09288v2, Jul. 19, 2023.
Vlad Gheorghe. "GPTrim." webpage <https://github.com/vlad-ds/gptrim/tree/main>, 1 page, Apr. 29, 2023.
XtractEdge. "Cutting through the noise—how generative AI will change the IDP landscape". Webpage <https://www.edgeverve.com/xtractedge/blogs/transforming-idp-with-generative/>, 3 pages, Jul. 21, 2023. [retrieved on Jul. 5, 2024].
Yu, W., Jiang, Z., Dong, Y., and Feng, J. "ReClor: A Reading Comprehension Dataset Requiring Logical Reasoning", In International Conference on Learning Representations (ICLR), 26 pages, 2020.
Zhang, T., Kishore, V., Wu, F., Weinberger, K. Q., and Artzi, Y. "BERTScore: Evaluating Text Generation with BERT", arXiv preprint arXiv:1904.09675v2, Oct. 1, 2019.
Zhang, X., and Lapata, M. "Sentence Simplification with Deep Reinforcement Learning", Association for Computational Linguistics, pp. 584-594, Sep. 2017.
Zilliztech. "GPTCache". Webpage <https://github.com/zilliztech/GPTCache>, MIT License, 5 pages, Nov. 27, 2023.

* cited by examiner

DETERMINING LARGE LANGUAGE MODEL EFFECTIVENESS UTILIZING DEEP LEARNING

BACKGROUND

Recent years have seen significant improvements in generative artificial intelligence technology. For example, many organizations use generative neural networks to summarize digital text. Generating summaries of digital text using computer-assisted methods, however, is a complex task that frequently leads to inaccurate and/or widely varying results. Indeed, generative neural networks must analyze and interpret the text, discern important information, and present the information in a coherent, condensed form. Achieving a high level of comprehension and synthesis through automated processes is challenging due, at least in part, to the subtleties of language and the diverse formats of digital content, often leading to summaries that may not fully capture the essence or accuracy of the original material.

SUMMARY

Embodiments of the present disclosure provide benefits and/or solve one or more of the foregoing or other problems in the art with systems, non-transitory computer-readable media, and methods for predicting, utilizing deep learning, summary quality scores and summary generation costs of large language models in generating digital document summaries. For example, the disclosed system determines text segments within a digital document and utilizes a quality prediction neural network to generate a predicted summary quality score for each of a plurality of large language models without actually invoking the large language models. Moreover, in one or more embodiments, the disclosed system utilizes a summary cost estimation algorithm to generate a summary generation cost for each of the plurality of large language models. The disclosed system utilizes a budget constraint algorithm that incorporates the predicted summary quality scores and the summary generation costs to select a large language model to summarize each of the text segments. Additionally, in some embodiments, the disclosed system utilizes the selected large language model(s) to generate a document summary of the digital document.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
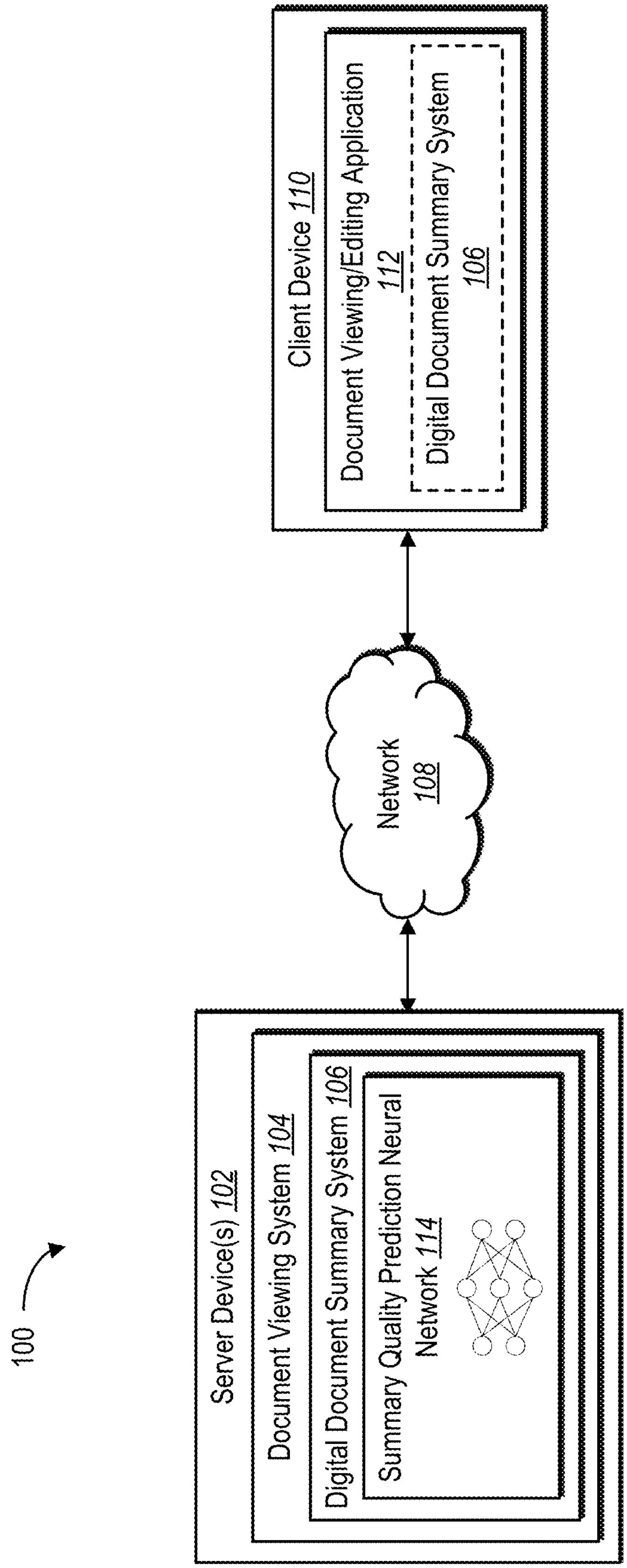
FIG. 1 illustrates an example system environment in which a digital document summary system operates in accordance with one or more embodiments.

This disclosure describes one or more embodiments of a digital document summary system that predicts summary quality scores and summary generation costs of large language models utilizing deep learning. In particular, in one or more implementations, the digital document summary system determines and extracts text segments from a digital document. Further, in one or more embodiments, the digital document summary system utilizes a quality prediction neural network to generate a predicted summary quality score for each of a plurality of large language models without utilizing the large language models to summarize the text segments. Moreover, in one or more implementations, the digital document summary system utilizes a summary cost estimation algorithm to generate a summary generation cost for each of the plurality of large language models to summarize the text segments. Furthermore, in some embodiments, the digital document summary system utilizes a budget constraint algorithm that incorporates the predicted summary quality scores and the summary generation costs to select a large language model to summarize the text segments. Additionally, in some implementations, the digital document summary system utilizes the selected large language model to generate a document summary of the digital document.

As mentioned above, in one or more embodiments, the digital document summary system utilizes a quality prediction neural network to generate a predicted summary quality score for each of a plurality of large language models to summarize text segments. In particular, in one or more implementations, the digital document summary system uses a bi-directional encoder of the quality prediction neural network to generate a text segment embedding for each text segment. Further, in some embodiments, the digital document summary system uses the quality prediction neural network to generate the predicted summary quality scores from each text segment embedding for each large language model without making any calls to the large language models. Moreover, in some implementations, the digital document summary system generates the predicted summary quality scores for each of the large language models jointly.

As noted above, in one or more embodiments, the digital document summary system utilizes a summary cost estimation algorithm to generate a summary generation cost for each of the plurality of large language models to summarize text segments. Specifically, in one or more implementations, the digital document summary system determines the summary generation costs by determining a text segment input cost and a summary output cost estimate for each text segment. Furthermore, in some embodiments, the digital document summary system determines the summary output cost estimate for each text segment by determining a length of a summary output based on a length parameter of a large language model prompt and determining an estimated token number of the summary output based on the length of the summary output.

As mentioned previously, in some implementations, the digital document summary system utilizes a budget constraint algorithm that incorporates the predicted summary quality scores and the summary generation costs to determine a large language model selection for each of the text segments. In particular, in one or more embodiments, the digital document summary system utilizes the budget constraint algorithm to maximize the summary quality scores subject to a budget constraint for generating the summary of the digital document. For example, in one or more implementations, the digital document summary system selects a large language model for each text segment based on the predicted summary quality scores and the summary generation costs using the budget constraint algorithm. Indeed, in some embodiments, the digital document summary system selects the large language models for each text segment without violating the budget constraint (or, in some implementations, with minimal violation).

In one or more embodiments, the digital document summary system utilizes a quality constraint algorithm to select a large language model for each text segment. In these or other embodiments, the digital document summary system incorporates the predicted summary quality scores and the summary generation costs to select the large language models. Additionally, in one or more implementations, the digital document summary system utilizes the quality constraint algorithm to maintain a quality threshold at a per instance level while minimizing the total cost of generating the digital document summary.

As noted previously, in some embodiments, the digital document summary system provides the text segments to one or more of the plurality of large language models to generate a document summary of the digital document. Specifically, the digital document summary system provides each text segment to a large language model selected for that text segment to generate the summary of the text segment. Further, in some implementations, the digital document summary system generates the digital document summary using the text segment summaries generated by, and received from, the selected large language models.

Although conventional systems use neural networks to summarize text, such systems have a number of problems in relation to accuracy, efficiency, and operational flexibility. For instance, conventional systems often generate inaccurate summaries of large amounts of text, such as text extracted from a large and complex digital document, based on the inherent challenges that neural network systems have with understanding complex human language. Further, conventional systems often use a single neural network to generate summaries of large amounts of text, which often results in inaccuracies due, for example, to the model's training dataset. Often, the size of the neural network, in terms of the number of parameters, affects the model's capacity to accurately generate summaries of large amounts of text, however larger models require more computational resources. Indeed, increases in the size of a neural network traditionally yields diminishing returns in accuracy improvements.

As just alluded to, in addition to inaccuracies, conventional systems often inefficiently generate summaries of large amounts of text. More specifically, conventional systems often utilize larger neural networks to improve accuracy of summary generation resulting in higher use of computational resources. Some conventional systems attempt to solve the inaccuracy problem by querying multiple neural networks to generate summaries from each for comparison and then selecting the most accurate summary. This approach, however, only compounds the efficiency problem by utilizing even more computational resources to query the multiple neural networks.

In addition to their inaccuracies and inefficiencies, conventional systems often lack operational flexibility when generating summaries of large amounts of text. In particular, as mentioned above, conventional systems often utilize a single large language model to generate text summaries. This inflexibility results in a number of downstream effects when generating summaries for large amounts of text, such as the inaccuracies and inefficiencies described above. These along with additional problems and issues exist with regard to conventional systems that summarize large amounts of text.

As suggested by the foregoing, the digital document summary system provides a variety of advantages relative to conventional systems. For example, by utilizing a plurality of large language models to summarize different text segments of a digital document, the digital document summary system improves accuracy relative to conventional systems. Specifically, by utilizing a plurality of large language models, the digital document summary system overcomes the inaccuracies introduced by utilizing a single large language model in generating a summary for large amounts of text. Indeed, the digital document summary system, in one or more embodiments, uses different large language models for different text segments of the digital document resulting in more accurate summaries of the text segments and/or a more accurate document summary of the digital document as a whole.

Furthermore, by predicting accuracy (or quality) of a plurality of large language models for each text segment extracted from a digital document, the digital document summary system improves efficiency relative to conventional systems. Specifically, in one or more implementations, for each text segment, the digital document summary system utilizes a quality prediction neural network to predict summary quality scores for each of the large language models. Utilizing the quality summary scores, the digital document summary system determines, in some embodiments, which of the large language models will produce the most accurate summary without having to query any of the large language models. Additionally, in some implementations, the digital document summary system selects a large language model based, at least in part, on the accuracy of the large language model and utilizes the large language model to generate the summary. Thus, in these or other embodiments, the digital document summary system preserves computational resources by predicting summary quality scores and generating one summary per text segment with one large language model. Further, in one or more embodiments, the digital document summary system also preserves computational resources by estimating the cost of generating a summary and utilizing a budget constraint algorithm to select a large language model. Indeed, in these or other embodiments, the digital document summary system generates high accuracy text segment summaries while avoiding the problem of diminishing accuracy returns discussed above, thereby, preserving valuable computational resources.

Moreover, by predicting summary quality (or accuracy) scores and summary generation costs prior to selecting a large language model, the digital document summary system improves operational flexibility relative to conventional systems. Specifically, in one or more implementations, the digital document summary system generates and utilizes both an accuracy metric and a cost metric to select a large language model for each text segment before generating any text segment summaries. Thus, in these or other embodiments, the digital document summary system is capable of utilizing more large language models than conventional systems without sacrificing either accuracy or efficiency. Indeed, in these or other embodiments, the digital document summary system maintains operational flexibility by utilizing more large language models to generate highly accurate text segment summaries while preserving valuable computational resources.

Additional detail regarding the digital document summary system 106 will now be provided with reference to the figures. For example, FIG. 1 illustrates a schematic diagram of an exemplary system 100 in which a digital document summary system 106 operates. As illustrated in FIG. 1, the system 100 includes a server devices(s) 102, a network 108, and a client device 110. Although the system 100 of FIG. 1 is depicted as having a particular number of components, the system 100 is capable of having any number of additional or alternative components (e.g., any number of servers, client devices, or other components in communication with the digital document summary system 106 via the network 108). Similarly, although FIG. 1 illustrates a particular arrangement of the server devices(s) 102, the network 108, and the client device 110, various additional arrangements are possible.

The server devices(s) 102, the network 108, and the client device 110 are communicatively coupled with each other either directly or indirectly (e.g., through the network 108 discussed in greater detail below in relation to FIG. 13). Moreover, the server devices(s) 102 and the client device 110 include one or more of a variety of computing devices (including one or more computing devices as discussed in greater detail with relation to FIG. 13).

As mentioned above, the system 100 includes the server devices(s) 102. In one or more embodiments, the server devices(s) 102 generates, stores, receives, and/or transmits data including notifications, models, and digital document summaries. In one or more embodiments, the server devices(s) 102 comprises a data server. In some implementations, the server devices(s) 102 comprises a communication server or a web-hosting server. Further, the server devices(s) 102 includes a document viewing system 104 which further includes the digital document summary system 106 and a summary quality prediction network 114.

In one or more embodiments, the client device 110 includes computing devices that access, edit, segment, modify, store, and/or provide, for display, digital content such as digital document summaries. For example, the client device 110 includes smartphones, tablets, desktop computers, laptop computers, head-mounted-display devices, or other electronic devices. The client device 110 includes one or more applications (e.g., a document viewing/editing application 112) that access, edit, segment, modify, store, and/or provide, for display, digital content such as digital document summaries. For example, in one or more embodiments, the document viewing/editing application 112 includes a software application installed on the client device 110. Additionally, or alternatively, the document viewing/editing application 112 includes a software application hosted on the server devices(s) 102 which are accessible by the client device 110 through another application, such as a web browser.

To provide an example implementation, in some embodiments, the digital document summary system 106 on the server devices(s) 102 supports the digital document summary system 106 on the client device 110. For example, the digital document summary system 106 on the server devices(s) 102 trains the summary quality prediction network 114 or other models. The client device 110 obtains (e.g., downloads) the digital document summary system 106 (and any associated trained machine learning models) from the server devices(s) 102. Once downloaded, the digital document summary system 106 on the client device 110 utilizes the summary quality prediction network 114 to generate a predicted summary quality score for each of a plurality of large language models without utilizing the large language models. The digital document summary system 106 on the client device 110 select one or more large language models to summarize one or more sections of a document based on the predicted summary quality scores. The digital document summary system 106 on the client device 110 generates text segment summaries by calling the selected large language models and combines the text segment summaries into a summary of the digital document.

In alternative implementations, the digital document summary system 106 includes a web hosting application that allows the client device 110 to interact with content and services hosted on the server devices(s) 102. To illustrate, in one or more implementations, the client device 110 accesses a software application supported by the server devices(s) 102. To illustrate, in some cases, the digital document summary system 106 on the client device 110 determines and extracts text segments from a digital document via a software application supported by the server devices(s) 102. The client device 110 transmits the extracted text segments to the server devices(s) 102. In response, the digital document summary system 106 on the server devices(s) 102 utilizes the summary quality prediction network 114 to generate a predicted summary quality score for each of a plurality of large language models without utilizing the large language models. The digital document summary system 106 on the server devices(s) 102 select one or more large language models to summarize one or more sections of a document based on the predicted summary quality scores.

The digital document summary system 106 on the server devices(s) 102 generates text segment summaries by calling the selected large language models and combines the text segment summaries into a summary of the digital document.

Although FIG. 1 illustrates the digital document summary system 106 being implemented by the server devices(s) 102, different components of the digital document summary system 106 are able to be implemented by a variety of devices within the system 100. For example, a different computing device (e.g., the client device 110) or a separate server device from the server devices(s) 102 implement one or more (or all) components of the digital document summary system 106. For example, the large language models are hosted by the server device(s) or third-party server devices. Example components of the digital document summary system 106 will be described below with regard to FIG. 9.

Figure 2:
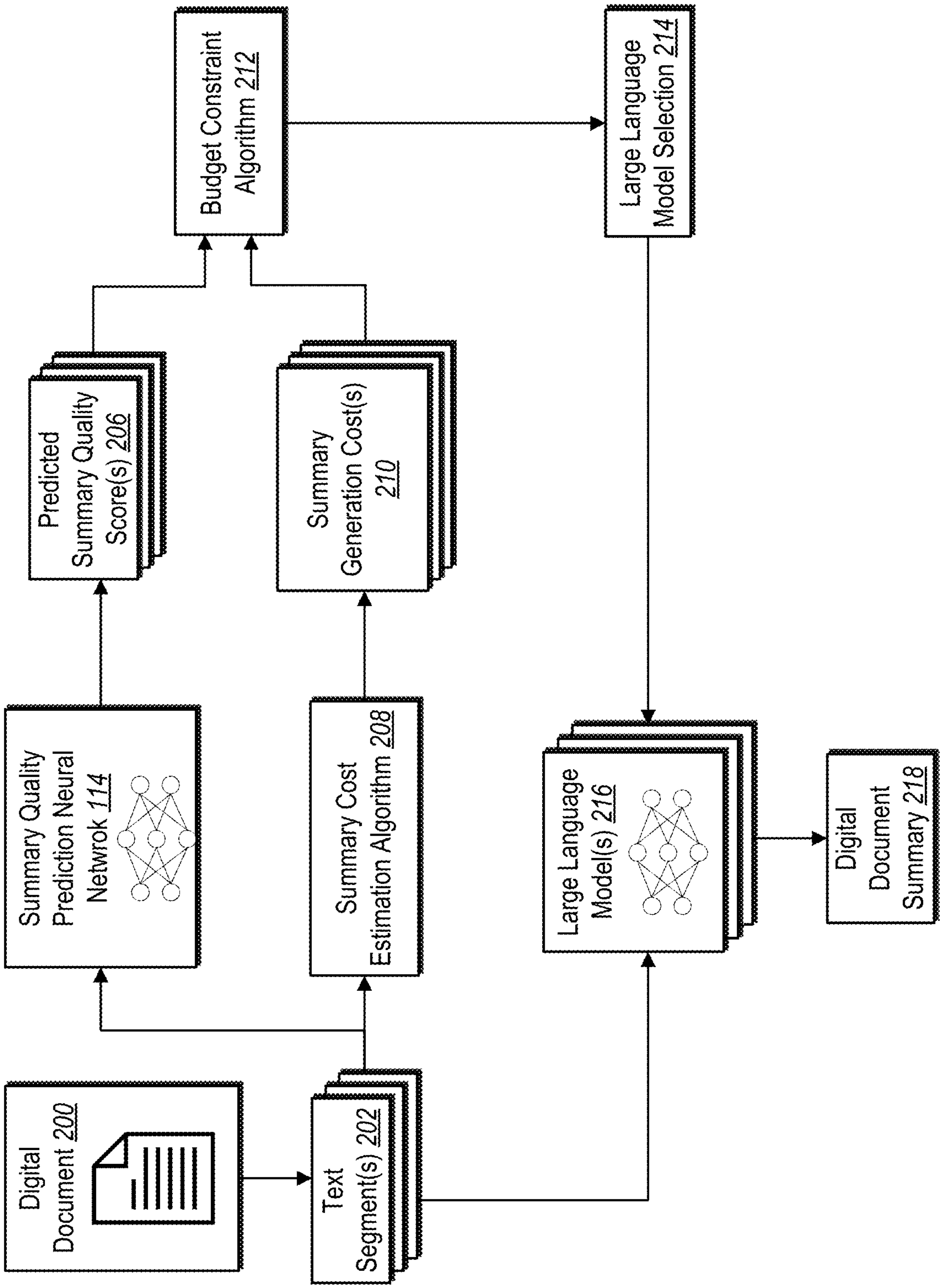
FIG. 2 illustrates the digital document summary system predicting summary quality scores for a plurality of large language models without invoking the large language models in accordance with one or more embodiments.

As previously mentioned, in some embodiments, the digital document summary system 106 predicts summary quality scores and summary generation costs of large language models to generate a digital document summary. The digital document summary system 106 selects one or more large language models based on the predicted summary quality scores and summary generation costs. FIG. 2 illustrates the digital document summary system 106 selecting and utilizing a plurality of large language models 216 to generate a digital document summary 218 in accordance with one or more embodiments.

In some implementations, the digital document summary system 106 determines text segments 202 within a digital document 200. Specifically, in one or more embodiments, the digital document summary system 106 determines the text segments 202 by extracting text from the digital document 200 and determining related text based on various aspects of the digital document 200 (e.g., formatting) as discussed in more detail with respect to FIG. 3. Furthermore, in one or more implementations, the text segments 202 include example sections of different types of text in the digital document 200. In alternative embodiments, the text segments 202 comprise all of text of the digital document 200.

Figure 4:
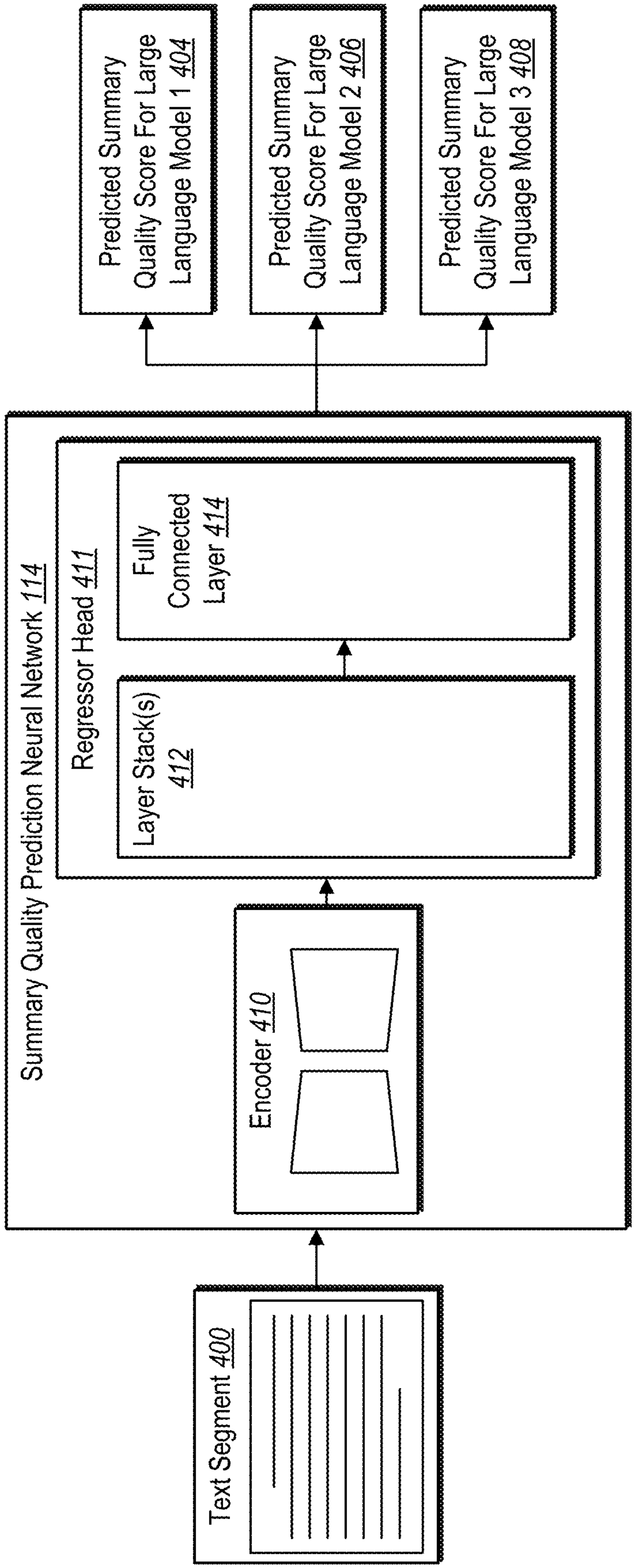
FIG. 4 illustrates a process flow of generating predicted summary quality scores for a plurality of large language models for summarizing a text segment in accordance with one or more embodiments

Additionally, in some embodiments, the digital document summary system 106 utilizes a summary quality prediction neural network 114 to generate a predicted summary quality score 206 for each of a plurality of large language models 216 to summarize the text segments 202, as discussed in more detail with respect to FIG. 4. In particular, in some implementations, for each text segment 202, the digital document summary system 106 utilizes the summary quality prediction neural network 114 to generate a predicted summary quality score 206 for each large language model 216.

Figure 5:
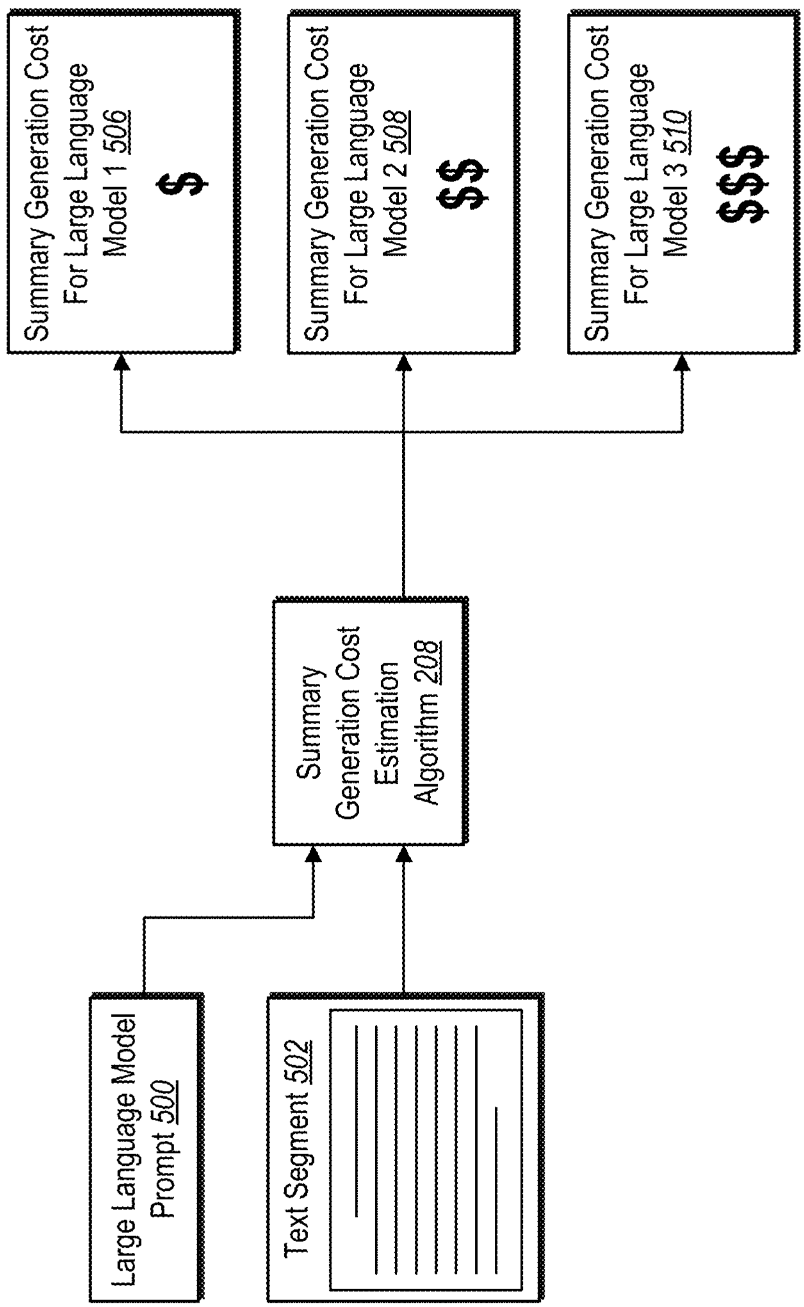
FIG. 5 illustrates a process flow of generating summary generation costs for a plurality of large language models in accordance with one or more embodiments.

Further, in one or more embodiments, the digital document summary system 106 utilizes a summary cost estimation algorithm 208 to generate a summary generation cost 210 for each of the plurality of large language models 216 for the text segments 202, as discussed in more detail with respect to FIG. 5. Specifically, in one or more implementations, for each text segment 202, the digital document summary system 106 utilizes the summary cost estimation algorithm 208 to generate a summary generation cost 210 for each large language model 216.

Figure 6:
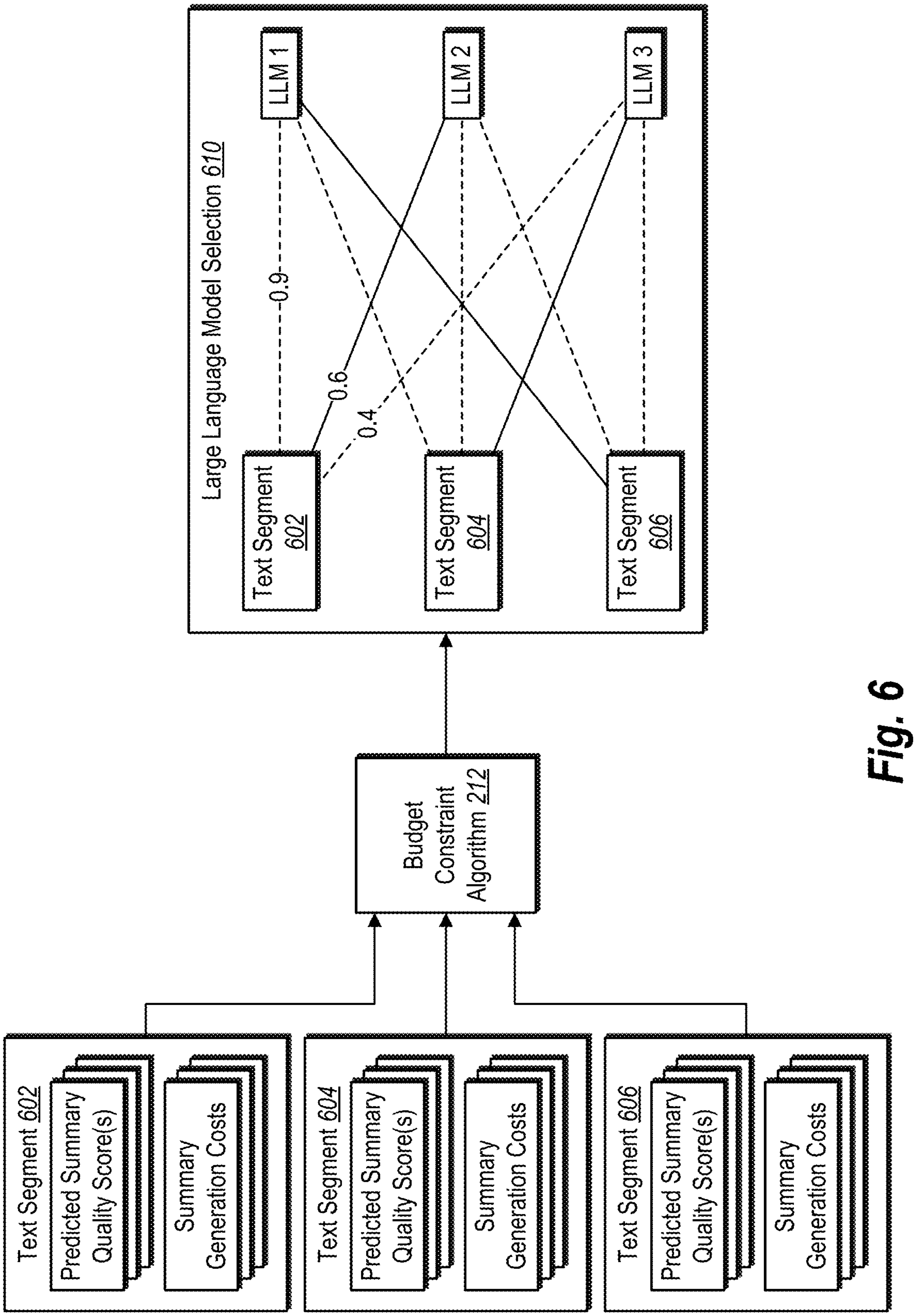
FIG. 6 illustrates a process flow of utilizing a budget constraint algorithm to select a large language model in accordance with one or more embodiments.

Moreover, in some embodiments, the digital document summary system 106 utilizes a budget constraint algorithm 212 that incorporates the predicted summary quality scores 206 and the summary generation costs 210 to determine a large language model selection 214 for each of the text segments 202, as discussed in more detail with respect to FIG. 6. For example, in some implementations, the digital document summary system 106 selects a large language model 216 for generating a summary of each text segment 202. Indeed, in one or more embodiments, the digital document summary system 106 selects large language model 216 to use to summarize a given text segment based on a combination of the predicted summary quality scores 206 and the summary generation costs 210 utilizing the budget constraint algorithm 212.

Furthermore, in one or more implementations, the digital document summary system 106 provides the text segments 202 (or text sections corresponding to the text segments 202) to one or more selected large language model(s) 216 to generate a summary 218 of the digital document (also referred to herein as a digital document summary). Specifically, in some embodiments, the digital document summary system 106 generates a summary of each text segment 202 by providing each text segment 202 to a single large language model according to the large language model selection 214. Additionally, in some implementations, the digital document summary system 106 utilizes the generated text segment summaries to generate the digital document summary 218. Further, in one or more embodiments, the digital document summary system 106 generates the digital document summary 218 for display on a user interface of a client device.

Figure 3:
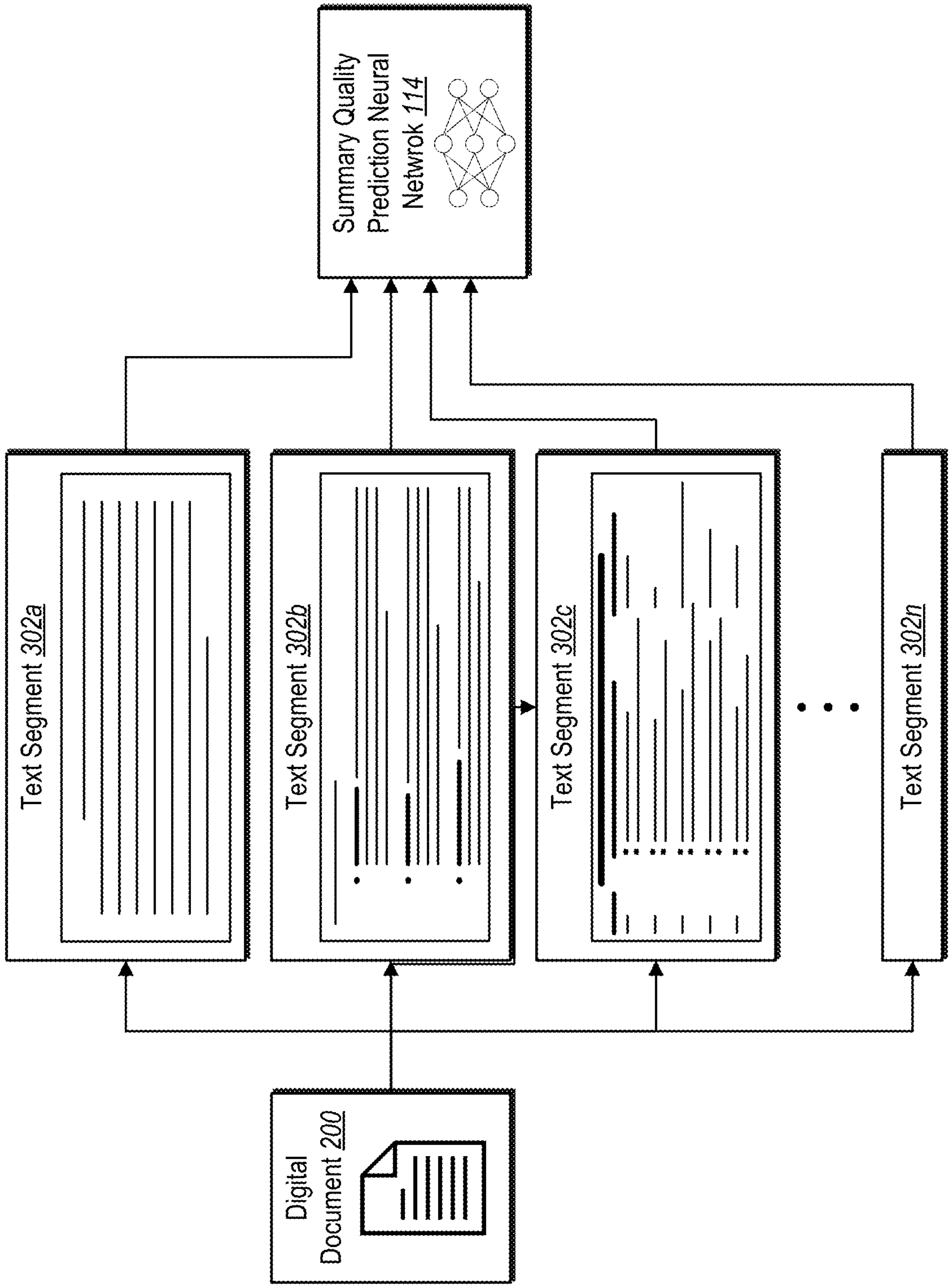
FIG. 3 illustrates a process flow of extracting text from a digital document and generating text segments in accordance with one or more embodiments.

As previously noted, in one or more implementations, the digital document summary system determines text segments within a digital document. Indeed, in some embodiments, the digital document summary system 106 extracts text from the digital document to generate and provide text segments to a summary quality prediction neural network 114. FIG. 3 illustrates a process flow of extracting text from a digital document and generating text segments in accordance with one or more embodiments.

As illustrated in FIG. 3, in some implementations, the digital document summary system 106 extracts text from the digital document 300 to generate text segments 302*a-n*. Specifically, in one or more embodiments, the digital document summary system 106 extracts text from the digital document 300 based on one or more of formatting, location, size, or metadata of the text. For example, in one or more implementations, the digital document summary system 106 extracts text based on various text structures or formats. Indeed, in some embodiments, the digital document summary system 106 extracts text based on text structures such as sentence and/or paragraph structures, location within the digital document 300, etc. Additionally, or alternatively, in some implementations, the digital document summary system 106 extracts the text based on text formats. For instance, the digital document summary system 106 determines the text formats (e.g., text within normal sentence and paragraph structures, text within lists, text within tables).

As further illustrated in FIG. 3, in one or more embodiments, the digital document summary system 106 extracts the text segments 302*a-n* from the digital document 300. In particular, the digital document summary system 106 generates the extracted text from the digital document 300 and groups the text into text segments. For instance, the digital document summary system 106 generates the text segments 302*a-n* by grouping the text based on the various text structures or formats. To illustrate, in one or more implementations, the digital document summary system 106 generates a text segment 302*a* to include text grouped upon sentence and/or paragraph structure. Moreover, in some embodiments, the digital document summary system 106 generates text segments 302*b-c* to include text grouped based on text formats (e.g., text in a list for text segment 302*b* and text in a table for text segment 302*c*).

As mentioned above, in one or more implementations, the digital document summary system utilizes a summary quality prediction neural network 114 to generate a predicted summary quality score for each of a plurality of large language models to summary a given text segment. FIG. 4 illustrates a process flow of generating predicted summary quality scores for a plurality of large language models in accordance with one or more embodiments.

As shown in FIG. 4, in some embodiments, the digital document summary system 106 utilizes text segments (e.g., text segment 400) extracted from a digital document and summary quality prediction neural network 114 to generate a quality level at which each large language model will summarize a given text segment. In one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial network, a graph neural network, a multilayer perceptron, a transformer, or a diffusion neural network. In some embodiments, a neural network includes a combination of neural networks or neural network components.

As shown in FIG. 4, in one or more embodiments, the summary quality prediction neural network 114 includes an encoder 410 and a regressor head 411. Furthermore, in one or more implementations, the digital document summary system 106 utilizes the encoder 410 to generate a text segment embedding from a text segment. The digital document summary system 106 utilizes the regressor head 411 to decode a given text segment embedding into a predicted summary quality score 404, 406, 408 for each large language model. As explained in greater detail, the summary quality prediction neural network 114 generates the predicted summary quality scores 404, 406, 408 without calling the large language models. In other words, the summary quality prediction neural network 114 predicts how accurate each of a plurality of large language models will summarize a text segment without having the large language models summarize the text segment or any portion thereof. Furthermore, the summary quality prediction neural network 114 predicts how accurate each of a plurality of large language models will summarize a text segment jointly. For example, the summary quality prediction neural network 114 generates the predicted summary quality scores 404, 406, 408 together from the same text embedding. Thus, the summary quality prediction neural network 114 reduces latency both by not calling/utilizing the large language models when generating the predicted summary quality scores 404, 406, 408 and jointly generating the predicted summary quality scores 404, 406, 408 for multiple large language models.

As mentioned above, in one or more embodiments, the encoder 410 generates embedding that encode the text segments. For example, the encoder 410 generates a numerical embedding that represents the semantic and contextual context of the text segments. For example, in one or more implementations, the encoder 410 comprises a computer algorithm that analyzes text (e.g., a word or a grouping of words, such as a text phrase) and generates one or more corresponding embeddings in an embedding space. For example, the encoder 410, in one or more implementations, includes algorithms, such as the Global Vectors for Word Representation (GloVe) model or the Embeddings from Language Model (ELMo) model. In one or more implementations, the encoder 410 is a transformer-based model, such as the Bidirectional Encoder Representations from Transformers (BERT) model. In some embodiments, the encoder 410 includes a transformer-based model designed to pretrain deep bidirectional representations (e.g., text segment embeddings) by conditioning on both left and right context in all layers. In these or other embodiments, the digital document summary system 106 generates an embedding for each text segment (i.e., text segment embeddings) for each of the text segments extracted from the digital document.

As further illustrated in FIG. 4, in some implementations, the digital document summary system 106 provides the text segment embeddings from the encoder 410 to the regressor head 411. In one or more embodiments, the regressor head 411 includes one or more layer stack(s) 412 and a fully connected layer 414. In one or more implementations, the regressor head 411 receives the text segment embeddings from the encoder 410 and predicts summary quality scores for a plurality of large language models.

In one or more implementations, the layer stack(s) 412 comprise a fully connected layer linear layer, a normalization layer, and a Gaussian Error Linear Unit (GeLU) activation. In one or more implementations, the layer stack(s) 412 comprise two stacks each with a fully connected layer linear layer, a normalization layer, and GeLU.

As further illustrated in FIG. 4, in some implementations, the digital document summary system 106 generates a predicted summary quality score for each of the large language models. To illustrate, in one or more embodiments, the digital document summary system 106 utilizes three large language models (i.e., large language model 1, large language model 2, and large language model 3). Although, FIG. 4 illustrates three large language models, in other implementations, the digital document summary system 106 generates a predicted summary quality score for more than three (4, 5 6, 10, etc.) or less than three (e.g., 2) large language models. Further, in these or other embodiments, the digital document summary system 106 generates the predicted summary quality score 404 for large language model 1 for a summary of text segment 400. Additionally, in these or other embodiments, for text segment 400, the digital document summary system 106 generates predicted summary quality scores 406 and 408 for large language model 2 and large language model 3, respectively, as shown.

Accordingly, the digital document summary system 106 generates a summary quality score for each text segment with each large language model. Indeed, in one or more implementations, by utilizing the summary quality prediction neural network 114 the digital document summary system 106 generates the predicted summary quality scores for each of the large language models without making any calls to the plurality of large language models. Moreover, in some embodiments, the digital document summary system 106 generates the predicted summary quality scores for each of the large language models jointly. Indeed, in these or other embodiments, the digital document summary system 106 predicts the predicted summary quality scores utilizing a single pass of a single model.

Furthermore, in some implementations, the digital document summary system 106 determines an order of the predicted summary quality scores for each text segment such that the large language models are ordered based on the predicted summary quality scores. In these or other embodiments, the digital document summary system 106 provides the ordering along with the predicted summary quality scores to additional components of the digital document summary system 106 for further processing as discussed in further detail below.

In one or more embodiments, the digital document summary system 106 trains the summary quality prediction neural network 114 using a training data set. For example, in one or more implementations, the digital document summary system 106 generates the training dataset by generating text segment summaries of various text segments using a high quality (i.e., high accuracy) large language model and treating these text segment summaries as ground truth. Additionally, in some embodiments, the digital document summary system 106 utilizes the plurality of large language models to generate output text segment summaries of the same text segments and determining a summary quality score for each generated summary. In these or other embodiments, the digital document summary system 106 utilizes these quality summary scores as ground truth values for summary quality prediction neural network 114. Indeed, in these or other embodiments, for each input text, the module generates 'm' scores where m is the number of large language models considered in the cascade (e.g., 3 to continue the example shown in FIG. 4).

In some implementations, the digital document summary system 106 determines the loss between the predicted summary quality scores and the ground truth summary quality scores. Further, in one or more embodiments, the digital document summary system 106 determines the loss by combining 1) a MlSE loss (e.g., between the predicted summary quality scores and the ground truth summary quality scores):

$$L_1 = \sum_{i=1}^{n} \|y^{(i)} - \hat{y}^{(i)}\|^2$$

and 2) an absolute difference between the L1 losses for each individual model:

$$L_2 = \sum_{i=1}^{n} \left(\left(y_1^{(i)} - y_2^{(i)}\right) - \left(\hat{y}_1^{(i)} - \hat{y}_2^{(i)}\right)\right)^2$$

In these or other embodiments, $y_1$ is the summary quality scores for a first large language model and $y_2$ is the summary quality scores for a second large language model. Moreover, in one or more implementations, for the combination of these losses, the digital document summary system 106 utilizes a convex combination of these two losses:

$$L = \alpha L_1 + \beta L_2$$

Furthermore, in some embodiments, the digital document summary system 106 uses a pre-trained bi-directional encoder fine-tuned on the training dataset discussed above. Additionally, in some implementations, the digital document summary system 106 utilizes an initial learning rate of 1e-3 with Adam optimizer and with hyperparameters $\alpha$=1 and $\beta$=2.4.

As noted above, in one or more embodiments, the digital document summary system utilizes a summary cost estimation algorithm to generate a summary generation cost for each of the plurality of large language models to summarize the text segments. For example, FIG. 5 illustrates a process flow of generating summary generation costs for a plurality of large language models in accordance with one or more embodiments.

As portrayed in FIG. 5, in one or more implementations, the digital document summary system 106 generates a large language model prompt 500. For example, in some embodiments, the digital document summary system 106 generates the large language model prompt 500 to include instructions for generating the prompt. Further, in some implementations, the digital document summary system 106 generates the instructions for the large language model prompt to include various parameters such as a summary output length parameter. Moreover, in one or more embodiments, the digital document summary system 106 generates the summary output length parameter to define the length of the summary output such as by defining a number of sentences, words, and/or paragraphs.

As additionally shown in FIG. 5, in one or more implementations, the digital document summary system 106 utilizes a summary generation cost estimation algorithm 504, the large language model prompt 500 and a text segment 502 to generate the summary generation costs for each large language model. In particular, the digital document summary system 106 utilizes various parameters or components of the large language model prompt 500 and the text segment 502 within the summary generation cost estimation algorithm 504. For instance, in some embodiments, the digital document summary system 106 utilizes a summary generation cost estimation algorithm 504 as follows:

$$c_{ij} = T_i c_j + F r_j.$$

In these or other embodiments, the digital document summary system 106 generates a summary generation cost ($c_{ij}$) for a given large language model from a text segment input cost and a summary output cost estimate for each of the plurality of large language models. For example, in some implementations, the digital document summary system 106 determines the text segment input cost from a length of the text segment ($T_i$) and the cost per input token ($c_j$) for the given large language model as indicated above. Furthermore, in one or more embodiments, the digital document summary system 106 determines the summary output cost estimate from an estimated number of tokens (i.e., token number) of the summary output (F) and the cost per response token ($r_j$) for the given large language model.

In one or more implementations, the digital document summary system 106 determines the estimated token number of the summary output (F) of a predicted text segment summary by estimating the average number of tokens per subunit of the summary output length. In particular, the digital document summary system 106 utilizes the summary output length (or subunit thereof such as a sentence) multiplied by an average number of tokens per summary output length (or subunit thereof). To illustrate, if the summary output length defined in the large language model prompt is two sentences, the digital document summary system 106 multiplies the average number of tokens per sentence by 2. To further illustrate, in some embodiments, the digital document summary system 106 determines the average number of tokens per subunit from summary output subunits generated by individual large language models, a subset of the large language models, by all of the large language models, or other data containing similar subunits.

As mentioned previously and as further illustrated in FIG. 5, in some implementations, the digital document summary system 106 generates the summary generation costs 506-510 for the large language models using the summary generation cost estimation algorithm 504. To illustrate, in these or other embodiments, the digital document summary system 106 predicts a lowest summary generation cost 506 for large language model 1, a medium summary generation cost 508 for large language model 2, and a highest summary generation cost 510 for large language model 3. Additionally, in one or more embodiments, the digital document summary system 106 implements the summary generation cost estimation algorithm 504 as part of an allocator module. Further, in one or more implementations, the digital document summary system 106 utilizes the summary generation costs for each large language model with the predicted summary quality scores described above to allocate each of the text segments to a large language model as discussed in further detail below.

As noted previously, in some embodiments, the digital document summary system utilizes a budget constraint algorithm that incorporates the predicted summary quality scores and the summary generation costs to determine a large language model selection for each of the text segments. FIG. 6 illustrates a process flow of utilizing a budget constraint algorithm to determine a large language model selection in accordance with one or more embodiments.

As depicted in FIG. 6, in some implementations, the digital document summary system 106 utilizes a budget constraint algorithm 608 to determine a large language model selection 610 based on quality and cost information for each text segment of a digital document. Specifically, in one or more embodiments, for each of text segments 602-606, the digital document summary system 106 utilizes predicted summary quality scores and summary generation costs. Indeed, in one or more implementations, the digital document summary system 106 determines the predicted summary quality scores and summary generation costs as discussed above with respect to FIGS. 4-5. Moreover, in some embodiments, the digital document summary system 106 implements the budget constraint algorithm 608 as part of an allocator module. Accordingly, in some implementations, the digital document summary system 106 utilizes an allocator module implementing the budget constraint algorithm 608 to determine a large language model selection 610 for each of the text segments 602-606.

In one or more embodiments, the digital document summary system 106 determines the large language model selection 610 subject to a budget constraint. In particular, in these or other embodiments, the digital document summary system 106 determines the budget constraint in response to receiving a budget input interaction via a user interface of a client device. In one or more implementations, the digital document summary system 106 determines the budget constraint from the budget input to include an overall cost for generating a document summary for a digital document. Furthermore, in some embodiments, the digital document summary system 106 determines the budget constraint to include a cost for each text segment, a cost for one or more subsets of text segments, or other division of the digital document content.

Additionally, in some implementations, the digital document summary system 106 utilizes the budget constraint algorithm 608 to maximize the quality of the text segment summaries subject to the budget constraint (i.e., while adhering to the budget constraint). In particular, in one or more embodiments, the digital document summary system 106 utilizes the budget constraint algorithm 608 to maximize the quality of the predicted text segment summary for each text segment by selecting an optimal large language model for each text segment. Indeed, in these or other embodiments, the digital document summary system 106 utilizes the budget constraint algorithm 608 to determine the large language model selection 610.

For example, As also depicted in FIG. 6, in one or more implementations, the digital document summary system 106 utilizes the budget constraint algorithm to determine the large language model selection 610. Indeed, in some embodiments, the digital document summary system 106 generates the large language model selection 610 to include the large language model selections for each text segment.

To illustrate, the digital document summary system 106 utilizes the predicted summary quality scores of each large language model (i.e., 0.9 for large language model 1, 0.6 for large language model 2, and. 0.4 for large language model 3) for text segment 602. In this example, the digital document summary system 106 selects large language model 2 (as reflected by the solid line) for text segment 602. Moreover, the digital document summary system 106 selects large language model 2 based on the predicted summary quality score (0.6) for the model by determining that this is the maximum possible predicted summary quality score for text segment 602 subject to the budget constraint. Further, in this illustration, the digital document summary system 106 selects large language model 3 for text segment 604 and large language model 1 for text segment 606 also utilizing the budget constraint algorithm 608. In some examples, the digital document summary system 106 determines that the budget constraint is sufficient to allow the digital document summary system 106 to select the large language model corresponding to the highest predicted summary quality score for each text segment.

Moreover, in some implementations, the digital document summary system 106 utilizes a budget constraint algorithm with various algorithm components. For example, the digital document summary system 106 maximizes the quality of the summary output as follows:

$$\sum_{j=1}^{m}\sum_{i=1}^{n} s_{ij}x_{ij}$$

subject to a budget constraint as follows:

$$\sum_{i=1}^{n} c_{ij}x_{ij} \leq B,$$

ensuring that each text segment is allocated to only one large language model as follows:

$$\sum_{j=1}^{m} x_{ij} = 1.$$

In the foregoing algorithm components, the following applies:

$$x_{ij} \in \{0, 1\} \forall\, i = 1, \ldots, n, j = 1, \ldots, m.$$

Furthermore, in one or more embodiments, the digital document summary system 106 determines the summary generation costs as described above with respect to FIG. 5. For example, the digital document summary system 106 utilizes the following:

$$c_{ij} = T_i c_j + F r_j.$$

Additionally, in one or more implementations, the digital document summary system 106 determines the predicted summary output score(s) on the $i^{th}$ text segment using the $j^{th}$ large language model as follows:

$$s_{ij} = BP(T_{ij}).$$

In some embodiments, B denotes the budget constraint, BP refers to the quality prediction neural network, n large language model denotes the number of text segments, m denotes the number of models. Further, in some implementations, $c_j$ denotes the input cost for the $j^{th}$ large language model, and $r_j$ denotes the output cost for the $j^{th}$ large language model.

Moreover, in one or more embodiments, the digital document summary system 106 simplifies the budget constraint algorithm 608 by relaxing the constraint of $\in\{0,1\}$ to $0 \leq x \leq 1$. In these or other embodiments, the digital document summary system 106 modifies the NP-Hard problem to a standard Linear Programming (LP) problem. Furthermore, in these or other embodiments, the digital document summary system 106 solves the LP and obtains the values for $x_i$. Additionally, in one or more implementations, for each text segment the digital document summary system 106 utilizes the maximum $x_i$ and modifies the rest of the $x_i$ to zeros. By doing so, in some embodiments, the digital document summary system 106 violates the budget constraint but the violation is minimal (e.g., <0.2%).

In some implementations, the digital document summary system 106 determines the large language model selection 610 subject to a quality constraint. In particular, in these or other embodiments, the digital document summary system 106 utilizes a quality constraint algorithm. For example, in these or other embodiments, the digital document summary system 106 utilizes a quality constraint as determined from a quality constraint input received via user interaction with a user interface of a client device. Further, in one or more embodiments, the digital document summary system 106 utilizes the quality constraint algorithm to maintain a quality threshold at a per instance level while minimizing the total cost of generating the summary for a digital document. Indeed, in one or more implementations, the digital document summary system 106 utilizes the quality constraint algorithm to ensure each large language model selection for each text segment meets the quality threshold while minimizing the total cost of generating the digital document summary. Moreover, in some embodiments, the digital document summary system determines the large language model selection for each text segment using the predicted summary quality scores and the summary generation costs. Further, in some embodiments, the digital document summary system 106 implements the quality constraint algorithm as part of an allocator module.

In some implementations, the digital document summary system 106 utilizes a quality constraint algorithm with various algorithm components. For example, the digital document summary system 106 minimizes the summary generation costs as follows:

$$\sum_{j=1}^{m} \sum_{i=1}^{n} c_{ij} x_{ij}$$

subject to a quality constraint as follows:

$$\sum_{i=1}^{n} s_{ij} x_{ij} \geq Q$$

ensuring that each text segment is allocated to only one large language model as follows:

$$\sum_{j=1}^{m} x_{ij} = 1.$$

In one or more embodiments, similar to the quality constraint algorithm discussed above, in the foregoing algorithm components, the following applies:

$$x_{ij} \in \{0, 1\} \forall\, i = 1, \ldots, n, j = 1, \ldots, m.$$

Furthermore, in one or more implementations, the digital document summary system 106 determines the summary generation costs as described above with respect to FIG. 5. For example, the digital document summary system 106 utilizes the following:

$$c_{ij} = T_i c_j + F r_j.$$

Additionally, in some embodiments, the digital document summary system 106 determines the predicted summary output score(s) on the $i^{th}$ text segment using the $j^{th}$ large language model as follows:

$$s_{ij} = BP(T_{ij}).$$

In some implementations, B denotes the budget constraint, BP refers to the quality prediction neural network, n large language model denotes the number of text segments, m denotes the number of models. Further, in one or more embodiments, $c_j$ denotes the input cost for the $j^{th}$ large language model, and $r_j$ denotes the output cost for the $j^{th}$ large language model.

Experiments were conducted to evaluate the effectiveness of the digital document summary system 106. Specifically, experiments used three large language models (GPT-3.5-Turbo, Text-Davinci-003, and Text-Curie-001). The experiments compared the digital document summary system 106 against the scenarios where only Text-Davinci-003 (most expensive) or only using GPT-3.5-Turbo was used for all text sections of a document. The experiments also included another baseline of random allocation of text segments to one of the large language models. Given the optimal fraction allocation percentages for each of the model if we randomly sample sections, what will be the cost and the average score. Table-1 shows that the digital document summary system 106 performs better than these baselines. Specifically, the digital document summary system 106 achieves 84.50% cost reduction and 3.2% performance improvement over the "Only Use Text-Davinci-003" baseline and achieves a 22.55% cost reduction and 1.2% performance improvement over the "Only Use GPT-3.5-Turbo" baseline.

| Method | Cost (1e−3 $) | Allocation GPT3.5/ Davinci/Curie | Avg. Accuracy Score |
|---|---|---|---|
| Only Text-Davinci-003 | 3549.71 | [0.00, 1.00, 0.00] | 0.746 |
| Only GPT-3.5-Turbo | 709.94 | [1.00, 0.00, 0.00] | 0.761 |
| System 106 (B = 370) | 370.01 | [0.16, 0.00, 0.84] | 0.708 |
| Random (B = 370) | 389.39 | [0.16, 0.00, 0.84] | 0.693 |
| System 106 (B = 550) | 550.12 | [0.79, 0.03, 0.18] | 0.770 |
| Random (B = 550) | 603.77 | [0.77, 0.07, 0.15] | 0.748 |
| System 106 (B = 1200) | 1201.01 | [0.62, 0.27, 0.11] | 0.782 |
| Random (B 1200) | 1378.02 | [0.62, 0.27, 0.11] | 0.748 |

Figure 7:
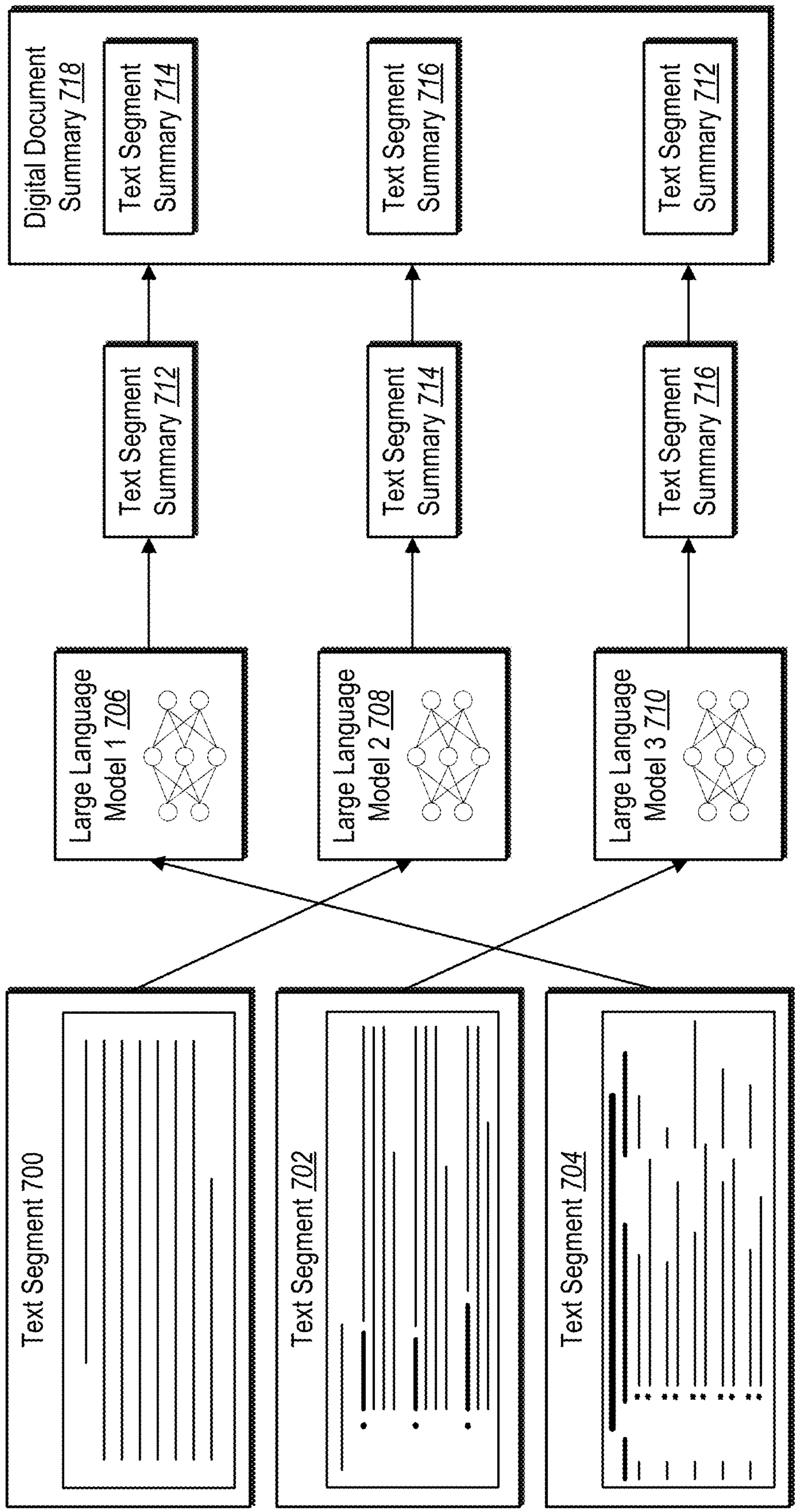
FIG. 7 illustrates a process flow of utilizing a plurality of large language models to generate a digital document summary in accordance with one or more embodiments.

As previously mentioned, in one or more implementations, the digital document summary system provides the text segments to one or more of the plurality of large language models to generate a document summary of the digital document. FIG. 7 illustrates a process flow of utilizing a plurality of large language models to generate a digital document summary in accordance with one or more embodiments.

As illustrated in FIG. 7, in some embodiments, the digital document summary system 106 provides text segments 700-704 to a plurality of large language models to generate a text segment summary for each text segment 700-704. Specifically, in some implementations, the digital document summary system 106 provides each text segment extracted from a digital document to the plurality of large language models according to the large language model selection as described above. To illustrate, based on a large language model selection, the digital document summary system 106 provides text segment 700 to large language model 2 708, text segment 702 to large language model 3 710, and text segment 704 to large language model 1 706.

As further illustrated in FIG. 7, in one or more embodiments, the digital document summary system 106 utilizes text segment summaries 712-716 received from the plurality of large language models (large language models 706-710) to generate a digital document summary 718. In particular, in one or more implementations, the digital document summary system 106 receives one or more text segment summaries from the plurality of large language models. To illustrate, in some embodiments, the digital document summary system 106 receives text segment summary 712 from large language model 1 706 for text segment 704, text segment summary 714 from large language model 2 708 for text segment 700, and text segment summary 716 from large language model 3 for text segment 702.

As previously noted, in some implementations, the digital document summary system 106 generates the digital document summary 718 using the text segment summaries 712-716. For example, in one or more embodiments, the digital document summary system 106 generates a combined digital document summary 718 by combining each of the text segment summaries 712-716. To illustrate, in these or other embodiments, the digital document summary system 106 generates the digital document summary 718 by combining the text segment summaries to match the order of the original text segments 700-704. For example, in these or other embodiments, text segment summary 714 of text segment 700 is first in order, followed by text segment summary 716 of text segment 702 and text segment summary 712 of text segment 704. Moreover, in one or more implementations, the digital document summary system 106 generates the summary of the digital document (i.e., the digital document summary 718), by combining the text segment summaries 712-716 in various different ways as discussed further with respect to FIG. 8.

Figure 8:
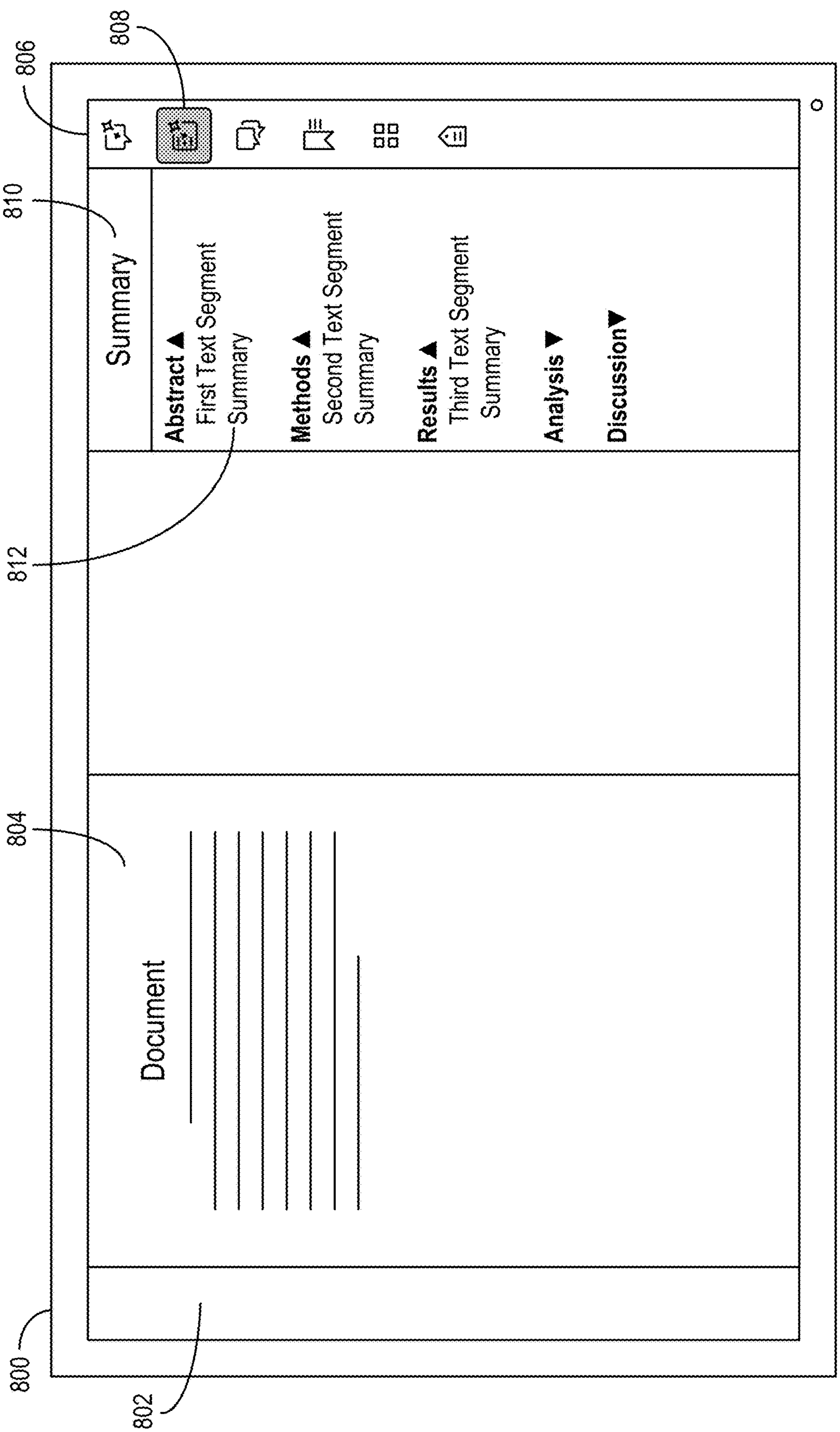
FIG. 8 illustrates an example summary generation interface and various operations performable via the summary generation interface in accordance with one or more embodiments.

As mentioned above, in some embodiments, the digital document summary system 106 generates the digital document summary for display on a user interface of a client device. For example, in some implementations, the digital document summary system 106 generates a summary generation interface for display on a client device. Furthermore, in one or more embodiments, the digital document summary system generates the summary generation interface for determining a digital document and displaying a summary thereof. FIG. 8 illustrates an example summary generation interface and various operations performable from the summary generation interface in accordance with one or more embodiments.

As illustrated in FIG. 8, the digital document summary system 106 generates and provides a summary generation interface 802 for display on a client device 800. In one or more implementations, within the summary generation interface 802, the digital document summary system 106 provides one or more elements for selecting a digital document 804. Additionally, in some embodiments, the digital document summary system 106 provides a display area for a selected digital document 804.

Further, in some implementations, the digital document summary system 106 provides a tools pane 806 for generating and displaying a summary 812 of the digital document 804. For example, in one or more embodiments, in response to user interaction with the tools pane 806, the digital document summary system 106 generates a summary pane 810 and a summary 812 within the summary pane 810. In particular, in one or more implementations, the digital document summary system 106 generates the tools pane 806 to include a document summary element 808. Moreover, in some embodiments, in response to user interaction with the document summary element 808, the digital document summary system 106 generates the summary pane 810 and the summary 812.

As just mentioned, in some implementations, in response to user interaction with the document summary element 808, the digital document summary system 106 generates the summary 812. For example, in one or more embodiments, in response to user interaction with the document summary element 808, the digital document summary system 106 extracts the text of the digital document 804 to generate text segments of the digital document 804 as described above with respect to FIG. 3. Furthermore, in one or more implementations, the digital document summary system 106 utilizes the text segments to generate text segment summaries using one or more of the plurality of large language models and generates the summary 812 as described above with respect to FIGS. 4-7. Additionally, in some embodiments, the digital document summary system 106 provides the summary 812 for display within the summary pane 810.

In some implementations, the digital document summary system 106 generates the summary 812 for display in the summary pane 810 with varying content from the text segment summaries and in various possible formats. For instance, in one or more embodiments, the digital document summary system 106 generates the summary 812 to include some or all of the text segment summaries. Further, in one or more implementations, the digital document summary system 106 generates the summary 812 to include expandable headings corresponding to content divisions within the digital document 804 as shown in FIG. 8. In these or other embodiments, for each expandable heading, the digital document summary system 106 generates a portion of the summary including some or all of the text segment summaries corresponding to text segments within content sections corresponding to the expandable heading. For example, in some embodiments, such content sections include an abstract, a methods section, a results section, an analysis section, a discussion section, etc.

To illustrate, the digital document summary system 106 generates an expandable heading for an abstract, a methods section, a results section, analysis section, and a discussion section as shown in FIG. 8. Moreover, in these or other embodiments, the digital document summary system generates the summary 812 of the digital document to include an abstract summary using a first text segment summary, a methods section summary using a second text segment summary, a results section summary using a third text segment summary, etc. Furthermore, in some implementations, the digital document summary system displays a summary of each content section in response to user interaction expanding the expandable heading corresponding to the content section as shown for the abstract heading, the methods heading, and the results heading in FIG. 8.

Figure 9:
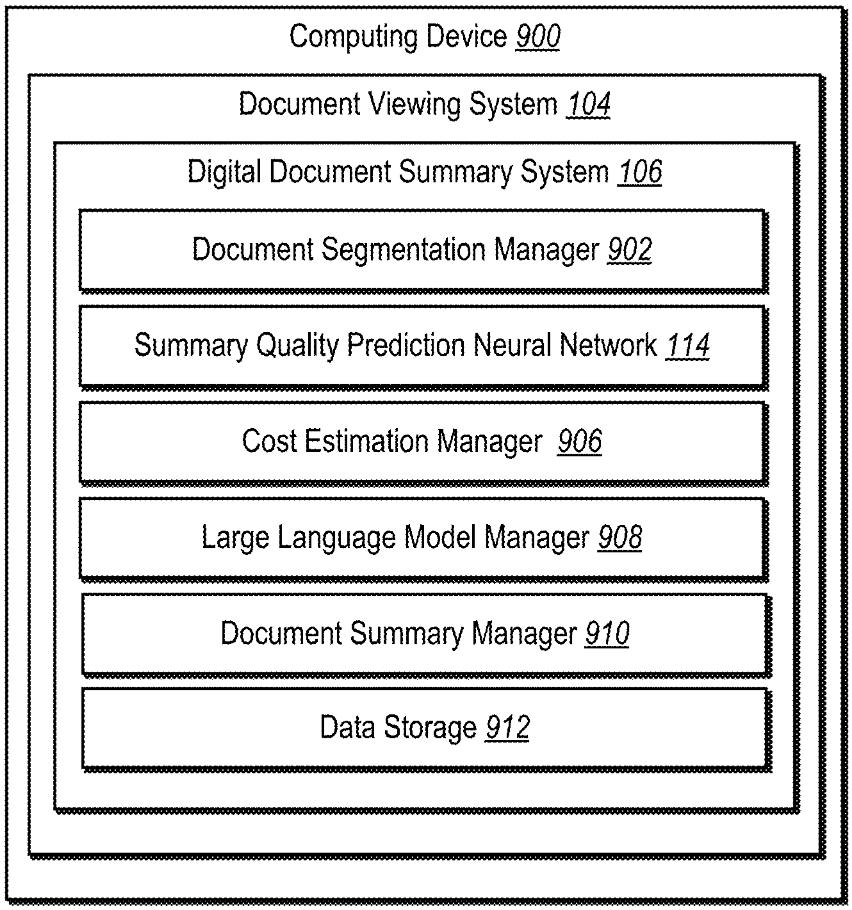
FIG. 9 illustrates an example schematic diagram of the digital document summary system in accordance with one or more embodiments.

Turning to FIG. 9, additional detail will now be provided regarding various components and capabilities of the digital document summary system 106. In particular, FIG. 9 illustrates an example schematic diagram of a computing device 900 (e.g., the server devices(s) 102 and/or the client device 110) implementing the digital document summary system 106 in accordance with one or more embodiments of the present disclosure for components 900-912. As illustrated in FIG. 9, the digital document summary system 106 includes a document segmentation manager 902, a quality prediction neural network 904, a cost estimation manager 906, a large language model manager 908, a document summary manager 910, and data storage 912.

The document segmentation manager 902 accesses one or more text digital documents and extracts text segments from the digital document. For example, the document segmentation manager 902 accesses the digital document and identifies or determines one or more text segments therein. For example, the document segmentation manager determines the text segments in response to user interaction with a graphical user interface of a client device. Additionally, the document segmentation manager 902 interacts with other components to pass the extracted text segments for further processing.

The quality prediction neural network 904 generates predicted summary quality scores for each of a plurality of large language models for each of the text segments. For example, the quality prediction neural network 904 receives the extracted text segment from the document segmentation manager and generates a text segment embedding for each text segment. Further, the quality prediction neural network 904 utilizes the text segment embeddings to generate the predicted summary quality scores using hidden layers and a final fully connected layer. Further, the quality prediction neural network 904 passes the predicted summary quality scores to other components for further processing.

The cost estimation manager 906 determines an estimated summary generation cost for generating text segment summaries of the text segments. In particular, the cost estimation manager utilizes a budget constraint algorithm and/or a quality constraint algorithm to generate the text segment summaries. Moreover, the cost estimation manager 906 generates the text segment summaries by determining a text segment input cost and a summary output cost estimate for each of the plurality of large language models. Furthermore, the cost estimation manager 906 passes the estimated summary generation costs to other components for further processing.

The large language model manager 908 receives the predicted summary quality scores and the estimated summary generation costs and generates a text segment summary for each of the text segments. In particular, the large language model manager 908 utilizes the predicted summary quality scores and the estimated summary generation costs to determine a large language model selection. Indeed, the large language model manager 908 determines the large language model selection by selecting one large language model from a plurality of large language models for each text segment. Additionally, the large language model manager 908 passes the text segment summaries to other components for further processing.

The document summary manager 910 generates a document summary of the digital document using the text segment summaries. For example, the document summary manager 910 receives the text segment summaries from the large language model manager 908 combines the text segment summaries into a summary of the digital document.

The data storage 912 stores digital documents, text segments, text segment embeddings, text segment summaries, algorithms, and pre-trained neural networks. For example, the data storage 912 stores digital text documents accessed from various locations on a computing device and/or on a network. Further, the data storage 912 stores determined text segments and generated text segment embeddings and summaries.

Each of the components 902-912 of the digital document summary system 106 can include software, hardware, or both. For example, the components 902-912 can include one or more instructions stored on a computer-readable storage medium and executable by processors of one or more computing devices, such as a client device or server device. When executed by the one or more processors, the computer-executable instructions of the digital document summary system 106 can cause the computing device(s) to perform the methods described herein. Alternatively, the components 902-912 can include hardware, such as a special-purpose processing device to perform a certain function or group of functions. Alternatively, the components 902-912 of the digital document summary system 106 can include a combination of computer-executable instructions and hardware.

Furthermore, the components 902-912 of the digital document summary system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-912 of the digital document summary system 106 may be implemented as a stand-alone application, such as a desktop or mobile application. Furthermore, the components 902-912 of the digital document summary system 106 may be implemented as one or more web-based applications hosted on a remote server. Alternatively, or additionally, the components 902-912 of the digital document summary system 106 may be implemented in a suite of mobile device applications or "apps." For example, in one or more embodiments, the digital document summary system 106 can comprise or operate in connection with digital software applications such as ADOBE® ACROBAT, ADOBE® DOCUMENT CLOUD, and/or ADOBE® EXPERIENCE PLATFORM. The foregoing are either registered trademarks or trademarks of Adobe Inc. in the United States and/or other countries.

FIGS. 1-9, the corresponding text, and the examples provide a number of different systems, methods, and non-transitory computer readable media predicting summary quality scores and summary generation costs of large language models to generate a digital document summary in accordance with one or more embodiments. In addition to the foregoing, embodiments can also be described in terms of flowcharts comprising acts for accomplishing a particular result. For example, FIGS. 10-12 illustrate flowcharts of example sequences of acts in accordance with one or more embodiments.

Figure 10:
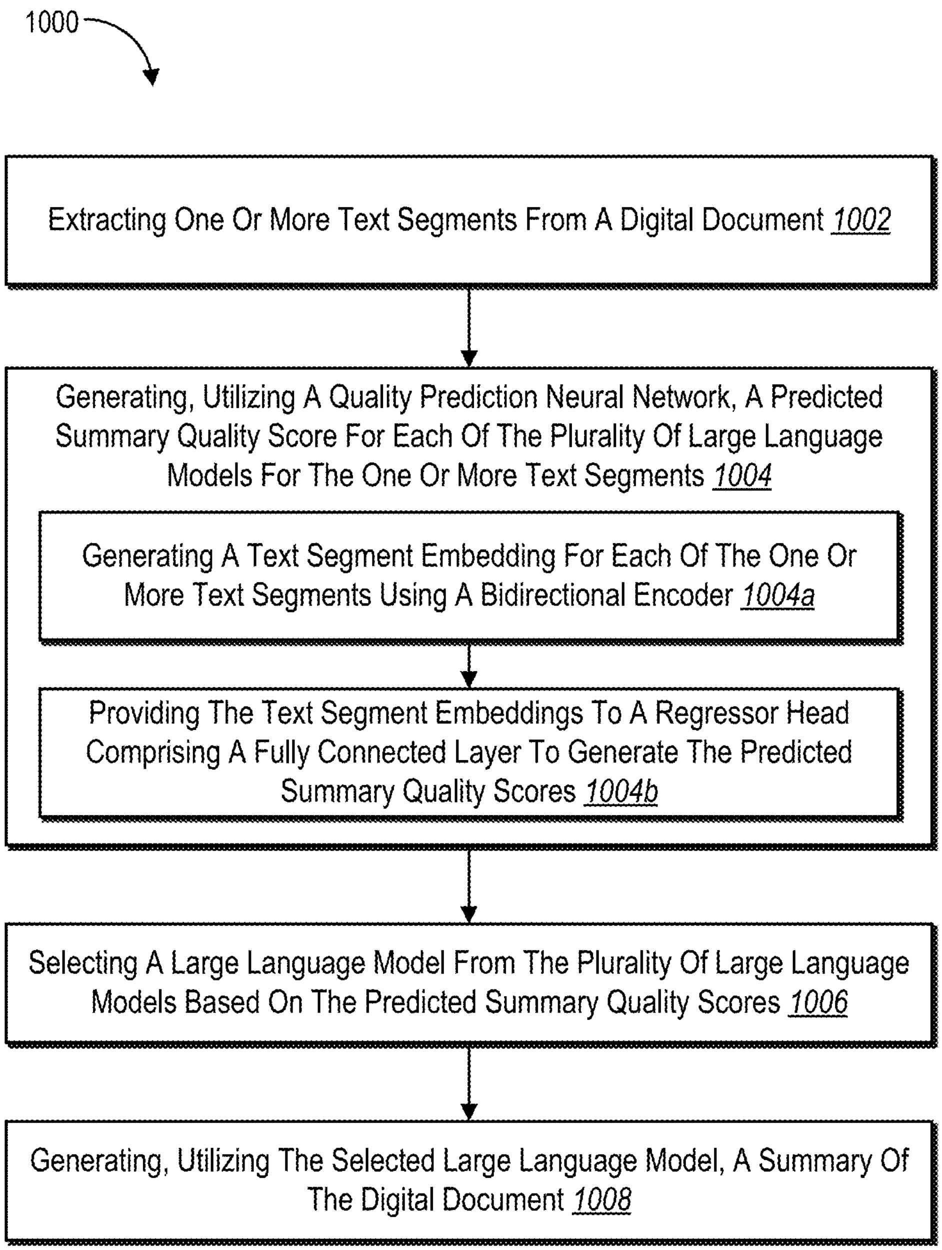
FIG. 10 illustrates a flowchart of a series of acts for generating predicted summary quality scores for large language models to summarize one or more text segments of a digital document in accordance with one or more embodiments.
Figure 11:
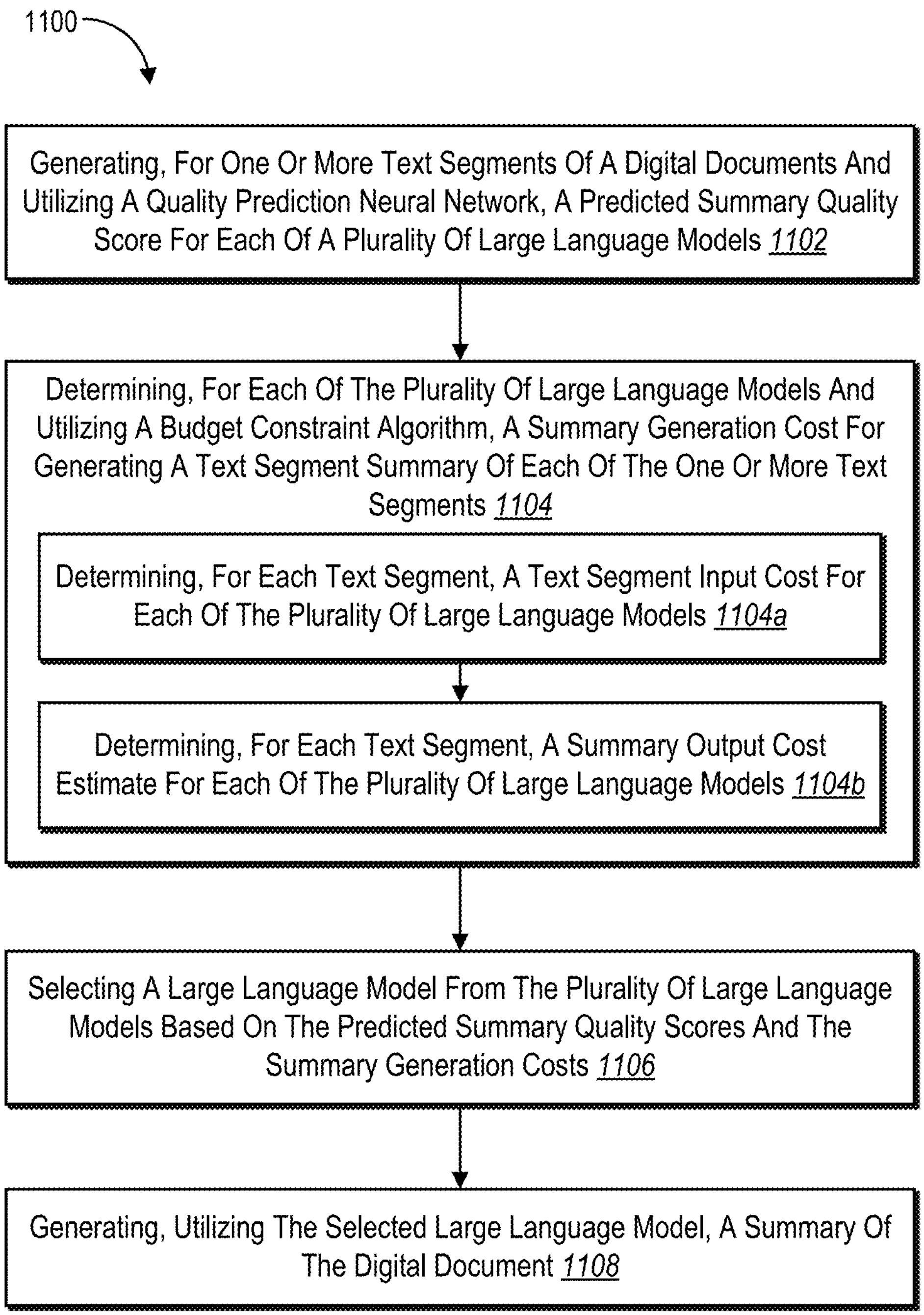
FIG. 11 illustrates a flowchart of a series of acts for determining summary generation costs for summarizing text segments of a digital document in accordance with one or more embodiments in accordance with one or more embodiments.
Figure 12:
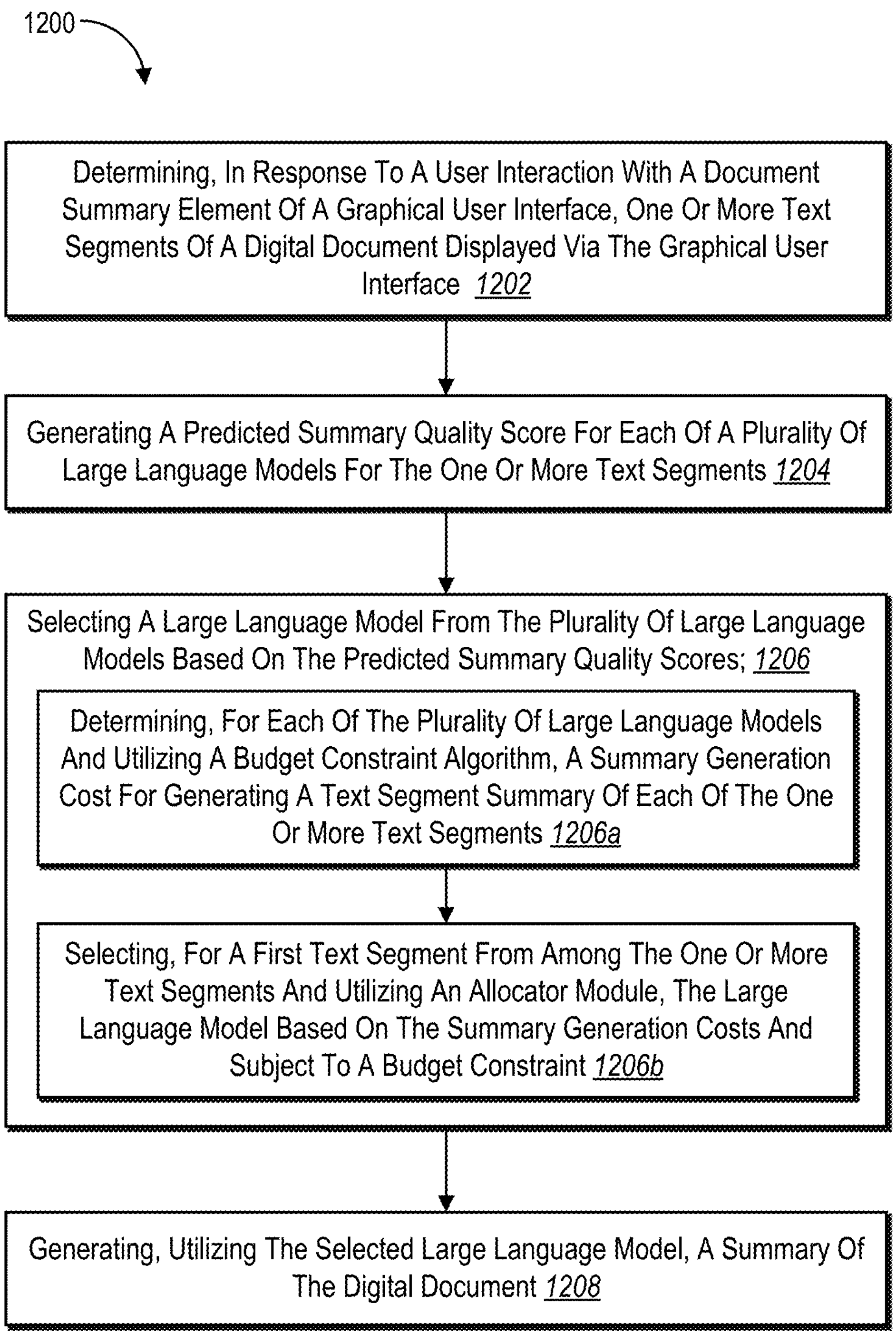
FIG. 12 illustrates a flowchart of a series of acts for selecting a large language model for summarizing text segments of a digital document based on predicted summary quality scores and estimated summary generation costs in accordance with one or more embodiments.

While FIGS. 10-12 illustrate acts according to some embodiments, alternative embodiments may omit, add to, reorder, and/or modify any of the acts shown in FIGS. 10-12. The acts of FIGS. 10-12 can be performed as part of a method. Alternatively, a non-transitory computer readable medium can comprise instructions, that when executed by one or more processors, cause a computing device to perform the acts of FIGS. 10-12. In still further embodiments, a system can perform the acts of FIGS. 10-12. Additionally, the acts described herein may be repeated or performed in parallel with one another or in parallel with different instances of the same or other similar acts.

FIG. 10 illustrates an example series of acts 1000 for generating predicted summary quality scores for one or more text segments of a digital document to generate a digital document summary in accordance with one or more embodiments. The series of acts 1000 include an act 1002 of extracting one or more text segments from a digital document; an act 1004 of generating, utilizing a quality prediction neural network, a predicted summary quality score for each of a plurality of large language models for the one or more text segments; an act 1006 of selecting a large language model from the plurality of large language models based on the predicted summary quality scores; and an act 1008 of generating, utilizing the selected large language model, a summary of the digital document. Further, the act 1004 include an act 1004*a* of generating a text segment embedding for each of the one or more text segments using an encoder; and an act 1004*b* of providing the text segment embeddings to a regressor head comprising a fully connected layer to generate the predicted summary quality scores.

In one or more embodiments, the series of acts 1000 include extracting, by at least one processor, one or more text segments from a digital document. The series of acts 1000 also include an act of generating, utilizing a quality prediction neural network, a predicted summary quality score for each of a plurality of large language models for the one or more text segments. The series of acts 1000 further include an act of selecting a large language model from the plurality of large language models based on the predicted summary quality scores. Additionally, the series of acts 1000 include an act of generating, utilizing the selected large language model, a summary of the digital document.

In one or more implementations, extracting the one or more text segments of the digital document includes determining one or more text formats within the digital document. The series of acts 1000 also include an act of extracting text corresponding to the one or more text formats.

In some embodiments, generating, utilizing the quality prediction neural network, the predicted summary quality score for each of the plurality of large language models includes generating a text segment embedding for each of the one or more text segments using an encoder. In some implementations, the series of acts 1000 include providing the text segment embeddings to a regressor head including a fully connected layer to generate the predicted summary quality scores.

In one or more embodiments, generating, utilizing the quality prediction neural network, the predicted summary quality score for each of the plurality of large language models for the one or more text segments is performed without making any calls to the plurality of large language models.

In one or more implementations, selecting the large language model from the plurality of large language models based on the predicted summary quality scores includes determining, for a first text segment from among the one or more text segments, an order of the predicted summary quality scores. The series of acts 1000 further include an act of selecting, subject to a budget constraint, the large language model corresponding to a highest predicted summary quality score.

In some embodiments, generating, utilizing the selected large language model, the summary of the digital document includes providing a first text segment from among the one or more text segments to a first selected large language model from among the plurality of large language models. Additionally, the series of acts 1000 include an act of providing a second text segment from among the one or more text segments to a second selected large language model from among the plurality of large language models.

In some implementations, the series of acts 1000 include receiving, from the first selected large language model, a first text segment summary of the first text segment. The series of acts 1000 also include an act of receiving, from the second selected large language model a second text segment summary of the second text segment. The series of acts 1000 further include an act of generating a combined text segment summary from the first and second text segment summaries.

FIG. 11 illustrates an example series of acts 1100 for determining summary generation costs for each text segment of a digital document to generate a digital document summary in accordance with one or more embodiments. The series of acts 1100 include an act 1102 of generating, for one or more text segments of a digital document and utilizing a quality prediction neural network, a predicted summary quality score for each of a plurality of large language models; an act 1104 of determining, for each of the plurality of large language models and utilizing a budget constraint algorithm, a summary generation cost for generating a text segment summary of each of the one or more text segments; an act 1106 of selecting a large language model from the plurality of large language models based on the predicted summary quality scores and the summary generation costs; and an act 1108 of generating, utilizing the selected large language model, a summary of the digital document. Moreover, in one or more embodiments, the act 1104 includes an act 1104*a* of determining, for each text segment, a text segment input cost for each of the plurality of large language models; and an act 1104*b* of determining, for each text segment, a summary output cost estimate for each of the plurality of large language models.

In one or more implementations, the series of acts 1100 include generating, for one or more text segments of a digital document and utilizing a quality prediction neural network, a predicted summary quality score for each of a plurality of large language models. Additionally, the series of acts 1100 include an act of determining, for each of the plurality of large language models and utilizing a budget constraint algorithm, a summary generation cost for generating a text segment summary of each of the one or more text segments. The series of acts 1100 also include an act of selecting a large language model from the plurality of large language models based on the predicted summary quality scores and the summary generation costs. The series of acts 1100 further include an act of generating, utilizing the selected large language model, a summary of the digital document.

In some embodiments, the series of acts 1100 include determining the summary generation cost for generating the text segment summary of the one or more text segments by determining, for each text segment, a text segment input cost for each of the plurality of large language models. Additionally, the series of acts 1100 include an act of determining, for each text segment, a summary output cost estimate for each of the plurality of large language models.

In some implementations, determining, for each text segment, the summary output cost estimate for each of the plurality of large language models includes determining a length of a summary output based on a length parameter of a large language model prompt. The series of acts 1100 also include an act of determining an estimated token number of the summary output based on the length of the summary output.

In one or more embodiments, the series of acts 1100 include generating, for the one or more text segments of the digital document and utilizing the quality prediction neural network, the predicted summary quality score for each of the plurality of large language models jointly.

In one or more implementations, the series of acts 1100 include generating, for the one or more text segments of the digital document and utilizing the quality prediction neural network, the predicted summary quality score for each of the plurality of large language models without making any calls to the plurality of large language models.

In some embodiments, selecting the large language model based on the predicted summary quality scores and the summary generation cost includes determining, for a first text segment from among the one or more text segments and utilizing an allocator module, a first large language model subject to a budget constraint for generating the summary of the digital document. The series of acts 1100 further include an act of the predicted summary quality scores for each of the one or more text segments. Additionally, the series of acts 1100 include an act of the summary generation costs for each of the one or more text segments.

In some implementations, the series of acts 1100 include determining, for a first text segment from among the one or more text segments and utilizing an allocator module, a first large language model subject to a quality constraint. The series of acts 1100 also include an act of the predicted summary quality scores for each of the one or more text segments. The series of acts 1100 further include an act of the summary generation costs for each of the one or more text segments.

FIG. 12 illustrates an example series of acts 1200 for selecting a large language model for summarizing each text segment of a digital document based on estimated summary generation costs to generate a digital document summary in accordance with one or more embodiments. The series of acts 1200 include an act 1202 of determining, in response to a user interaction with a document summary element of a graphical user interface, one or more text segments of a digital document displayed via the graphical user interface; an act 1204 of generating a predicted summary quality score for each of a plurality of large language models for the one or more text segments; an act 1206 of selecting a large language model from the plurality of large language models based on the predicted summary quality scores; and an act 1208 of generating, utilizing the selected large language model, a summary of the digital document. Furthermore, in one or more embodiments, the act 1206 includes an act 1206*a* of determining, for each of the plurality of large language models and utilizing a budget constraint algorithm, a summary generation cost for generating a text segment summary of each of the one or more text segments; and an act 1206*b* of selecting, for a first text segment from among the one or more text segments and utilizing an allocator module, the large language model based on the summary generation costs and subject to a budget constraint.

In one or more implementations, the series of acts 1200 include determining, in response to a user interaction with a document summary element of a graphical user interface, one or more text segments of a digital document displayed via the graphical user interface. Additionally, the series of acts 1200 include an act of generating, utilizing a quality prediction neural network, a predicted summary quality score for each of a plurality of large language models for the one or more text segments. The series of acts 1200 also include an act of selecting a large language model from the plurality of large language models based on the predicted summary quality scores. The series of acts 1200 further include an act of generating, utilizing the selected large language model, a summary of the digital document.

In some embodiments, the series of acts 1200 include generating, for the one or more text segments of the digital document and utilizing the quality prediction neural network, the predicted summary quality score for each of the plurality of large language models jointly and without making any calls to the plurality of large language models.

In some implementations, selecting the large language model from the plurality of large language models based on the predicted summary quality scores further includes determining, for each of the plurality of large language models and utilizing a budget constraint algorithm, a summary generation cost for generating a text segment summary of each of the one or more text segments. Additionally, the series of acts 1200 include an act of selecting, for a first text segment from among the one or more text segments and utilizing an allocator module, the large language model based on the summary generation costs and subject to a budget constraint.

In one or more embodiments, the series of acts 1200 include selecting, for a second text segment from among the one or more text segments and utilizing the allocator module, an additional large language model from among the plurality of large language models subject to the budget constraint and a quality constraint. The series of acts 1200 also include an act of the predicted summary quality scores for each of the one or more text segments. The series of acts 1200 further include an act of the summary generation costs for each of the one or more text segments.

In one or more implementations, the series of acts 1200 include providing the summary of the digital document generating, for a first text segment from among the one or more text segments and utilizing the selected large language model, a first text segment summary. Additionally, the series of acts 1200 include an act of generating, for a second text segment from among the one or more text segments and utilizing an additional large language model, a second text segment summary. The series of acts 1200 also include an act of combining the first and second text segment summaries.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
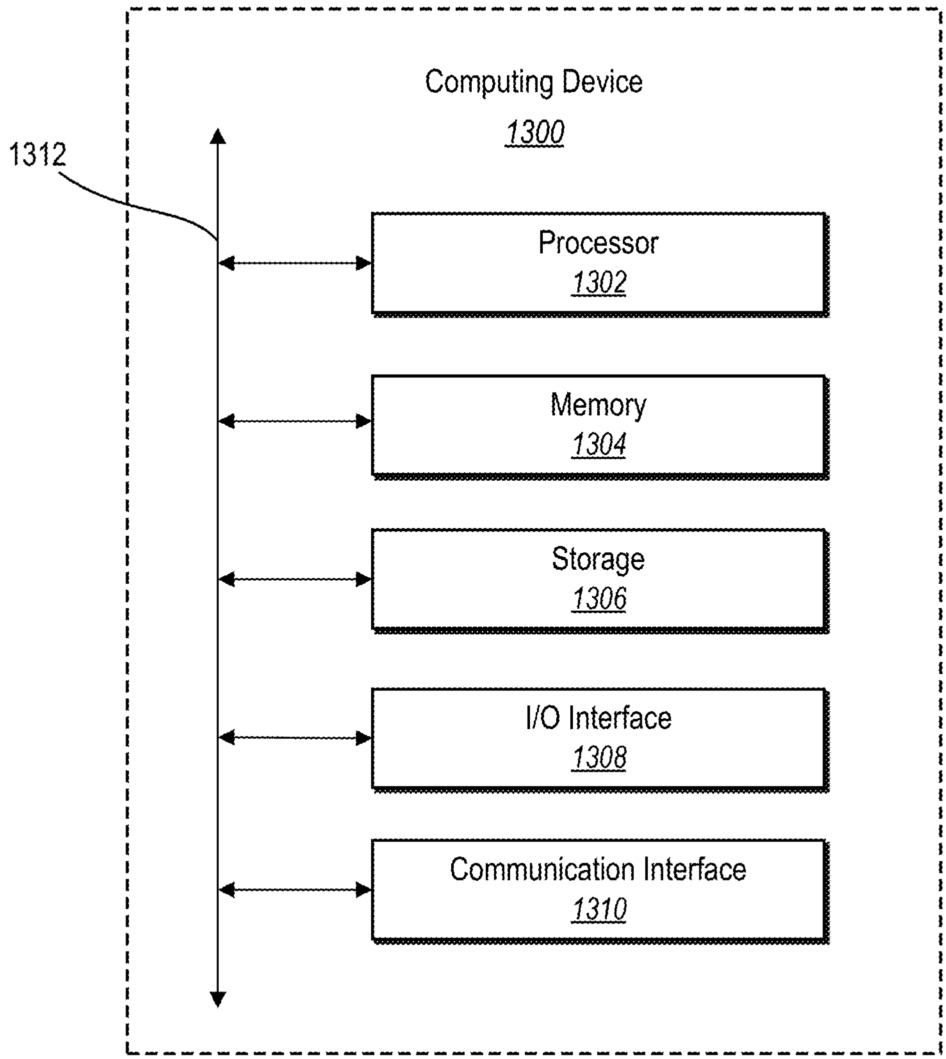
FIG. 13 illustrates a block diagram of an example computing device for implementing one or more embodiments of the present disclosure.

FIG. 13 illustrates a block diagram of exemplary computing device 1300 (e.g., the server devices(s) 102 and/or the client device 110) that may be configured to perform one or more of the processes described above. One will appreciate that server devices(s) 102 and/or the client device 110 may comprise one or more computing devices such as computing device 1300. As shown by FIG. 13, computing device 1300 can comprise processor 1302, memory 1304, storage device 1306, I/O interface 1308, and communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other implementations. Furthermore, in certain implementations, computing device 1300 can include fewer components than those shown in FIG. 13. Components of computing device 1300 shown in FIG. 13 will now be described in additional detail.

In particular implementations, processor 1302 includes hardware for executing instructions, such as those making up a computer program. As an example, and not by way of limitation, to execute instructions, processor 1302 may retrieve (or fetch) the instructions from an internal register, an internal cache, memory 1304, or storage device 1306 and decode and execute them. In particular implementations, processor 1302 may include one or more internal caches for data, instructions, or addresses. As an example, and not by way of limitation, processor 1302 may include one or more instruction caches, one or more data caches, and one or more translation lookaside buffers (TLBs). Instructions in the instruction caches may be copies of instructions in memory 1304 or storage device 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example, and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to computing device 1300. In particular implementations, storage device 1306 is non-volatile, solid-state memory. In other implementations, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

extracting, by at least one processor, one or more text segments from a digital document;

generating, utilizing a summary quality prediction neural network, a predicted summary quality score for each of a plurality of large language models for the one or more text segments without calling the plurality of large language models;

selecting a large language model from the plurality of large language models based on the predicted summary quality scores; and generating, utilizing the selected large language model, a summary of the digital document.

2. The computer-implemented method of claim 1, wherein extracting the one or more text segments of the digital document comprises:

determining one or more text formats within the digital document; and extracting text corresponding to the one or more text formats.

3. The computer-implemented method of claim 1, wherein generating, utilizing the summary quality prediction neural network, the predicted summary quality score for each of the plurality of large language models comprises generating a text segment embedding for each of the one or more text segments using an encoder.

4. The computer-implemented method of claim 3, further comprising providing the text segment embeddings to a regressor head comprising a fully connected layer to generate the predicted summary quality scores.

5. The computer-implemented method of claim 1, wherein generating, utilizing the summary quality prediction neural network, the predicted summary quality score for each of the plurality of large language models for the one or more text segments is performed without making any calls to the plurality of large language models.

6. The computer-implemented method of claim 1, wherein selecting the large language model from the plurality of large language models based on the predicted summary quality scores comprises:

determining, for a first text segment from among the one or more text segments, an order of the predicted summary quality scores; and selecting, subject to a budget constraint, the large language model corresponding to a highest predicted summary quality score.

7. The computer-implemented method of claim 1, wherein generating, utilizing the selected large language model, the summary of the digital document comprises:

providing a first text segment from among the one or more text segments to a first selected large language model from among the plurality of large language models; and providing a second text segment from among the one or more text segments to a second selected large language model from among the plurality of large language models.

8. The computer-implemented method of claim 7, further comprising:

receiving, from the first selected large language model a first text segment summary of the first text segment;

receiving, from the second selected large language model a second text segment summary of the second text segment; and generating a combined text segment summary from the first and second text segment summaries.

9. A system comprising:

one or more memory devices; and one or more processors coupled to the one or more memory devices, the one or more processors configured to cause the system to:

generate, for one or more text segments of a digital document and utilizing a summary quality prediction neural network, a predicted summary quality score for each of a plurality of large language models;

determine, for each of the plurality of large language models and utilizing a budget constraint algorithm, a summary generation cost for generating a text segment summary of each of the one or more text segments;

select a large language model from the plurality of large language models based on the predicted summary quality scores and the summary generation costs; and generate, utilizing the selected large language model, a summary of the digital document.

10. The system of claim 9, wherein the one or more processors are further configured to determine the summary generation cost for generating the text segment summary of the one or more text segments by:

determining, for each text segment, a text segment input cost for each of the plurality of large language models; and determining, for each text segment, a summary output cost estimate for each of the plurality of large language models.

11. The system of claim 10, wherein determining, for each text segment, the summary output cost estimate for each of the plurality of large language models comprises:

determining a length of a summary output based on a length parameter of a large language model prompt; and determining an estimated token number of the summary output based on the length of the summary output.

12. The system of claim 9, wherein the one or more processors are further configured to generate, for the one or more text segments of the digital document and utilizing the quality prediction neural network, the predicted summary quality score for each of the plurality of large language models jointly.

13. The system of claim 12, wherein the one or more processors are further configured to generate, for the one or more text segments of the digital document and utilizing the summary quality prediction neural network, the predicted summary quality score for each of the plurality of large language models without making any calls to the plurality of large language models.

14. The system of claim 9, wherein selecting the large language model based on the predicted summary quality scores and the summary generation cost comprises:

determining, for a first text segment from among the one or more text segments and utilizing an allocator module, a first large language model subject to:

a budget constraint for generating the summary of the digital document;

the predicted summary quality scores for each of the one or more text segments; and the summary generation costs for each of the one or more text segments.

15. The system of claim 9, wherein the one or more processors are further configured to determine, for a first text segment from among the one or more text segments and utilizing an allocator module, a first large language model subject to:

a quality constraint;

the predicted summary quality scores for each of the one or more text segments; and the summary generation costs for each of the one or more text segments.

16. A non-transitory computer readable medium storing executable instructions which, when executed by a processing device, cause the processing device to perform operations comprising:

determining, in response to a user interaction with a document summary element of a graphical user interface, one or more text segments of a digital document displayed via the graphical user interface;

generating, utilizing a summary quality prediction neural network, a predicted summary quality score for each of a plurality of large language models for the one or more text segments without calling the plurality of large language models;

selecting a large language model from the plurality of large language models based on the predicted summary quality scores; and generating, utilizing the selected large language model, a summary of the digital document.

17. The non-transitory computer readable medium of claim 16, wherein the operations further comprise generating, for the one or more text segments of the digital document and utilizing the summary quality prediction neural network, the predicted summary quality score for each of the plurality of large language models jointly and without making any calls to the plurality of large language models.

18. The non-transitory computer readable medium of claim 16, wherein selecting the large language model from the plurality of large language models based on the predicted summary quality scores further comprises:

determining, for each of the plurality of large language models and utilizing a budget constraint algorithm, a summary generation cost for generating a text segment summary of each of the one or more text segments; and selecting, for a first text segment from among the one or more text segments and utilizing an allocator module, the large language model based on the summary generation costs and subject to a budget constraint.

19. The non-transitory computer readable medium of claim 18, wherein the operations further comprise selecting, for a second text segment from among the one or more text segments and utilizing the allocator module, an additional large language model from among the plurality of large language models subject to:

the budget constraint and a quality constraint;

the predicted summary quality scores for each of the one or more text segments; and the summary generation costs for each of the one or more text segments.

20. The non-transitory computer readable medium of claim 16, wherein the operations further comprise providing the summary of the digital document by:

generating, for a first text segment from among the one or more text segments and utilizing the selected large language model, a first text segment summary;

generating, for a second text segment from among the one or more text segments and utilizing an additional large language model, a second text segment summary; and combining the first and second text segment summaries.

* * * * *